(12) United States Patent
Park

(10) Patent No.: US 12,443,825 B2
(45) Date of Patent: Oct. 14, 2025

(54) NEURAL PROCESSING UNIT AND METHOD OF OPERATION THEREOF

(71) Applicant: DEEPX CO., LTD., Seongnam-si (KR)

(72) Inventor: Jung Boo Park, Seoul (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/415,684

(22) Filed: Jan. 18, 2024

(65) Prior Publication Data

US 2024/0152738 A1    May 9, 2024

Related U.S. Application Data

(63) Continuation of application No. PCT/KR2023/009803, filed on Jul. 10, 2023.

(30) Foreign Application Priority Data

Jul. 8, 2022  (KR) .......................... 10-2022-0084611

(51) Int. Cl.
| | | |
|---|---|---|
| *G06N 3/063* | (2023.01) | |
| *G06N 3/045* | (2023.01) | |
| *G06N 3/0464* | (2023.01) | |
| *G06N 3/06* | (2006.01) | |
| *G06T 1/20* | (2006.01) | |

(52) U.S. Cl.
CPC ............. *G06N 3/0464* (2023.01); *G06T 1/20* (2013.01)

(58) Field of Classification Search
CPC ................................ G06N 3/0464; G06T 1/20
See application file for complete search history.

(56) References Cited

U.S. PATENT DOCUMENTS

| 11,455,487 | B1* | 9/2022 | Kagalwalla | ............ G06V 20/69 |
| 2019/0057060 | A1* | 2/2019 | Nicol | ....................... G06F 15/80 |
| 2020/0167309 | A1* | 5/2020 | Nicol | ................... G06F 15/7867 |
| 2020/0174707 | A1* | 6/2020 | Johnson | .............. G06F 12/0207 |
| 2021/0019633 | A1* | 1/2021 | Venkatesh | .............. G06N 3/063 |
| 2021/0406646 | A1* | 12/2021 | Han | ....................... G06F 9/3877 |
| 2022/0261623 | A1* | 8/2022 | Sung | ........................ G06F 7/50 |

FOREIGN PATENT DOCUMENTS

| KR | 10-2018-0073118 A | 7/2018 |
| KR | 10-2019-0051697 A | 5/2019 |
| KR | 10-2019-0132415 A | 11/2019 |
| KR | 10-2020-0095300 A | 8/2020 |
| KR | 10-2021-0099991 A | 8/2021 |
| KR | 10-2021-0120434 A | 10/2021 |
| KR | 10-2022-0030084 A | 3/2022 |
| KR | 10-2022-0097161 A | 7/2022 |

\* cited by examiner

*Primary Examiner* — Brandon S Cole
(74) *Attorney, Agent, or Firm* — Invenstone patent LLC

(57) ABSTRACT

An operating method for a neural processing unit is provided. The method includes determining, by a controller, that an operation performed in a first convolution layer is a transpose convolution operation, dividing, by the controller, a kernel used for the transpose convolution operation into a plurality of sub-kernels, and performing, by at least one processing element, a convolution operation between an input feature map and each of the plurality of sub-kernels in the first convolution layer.

20 Claims, 13 Drawing Sheets

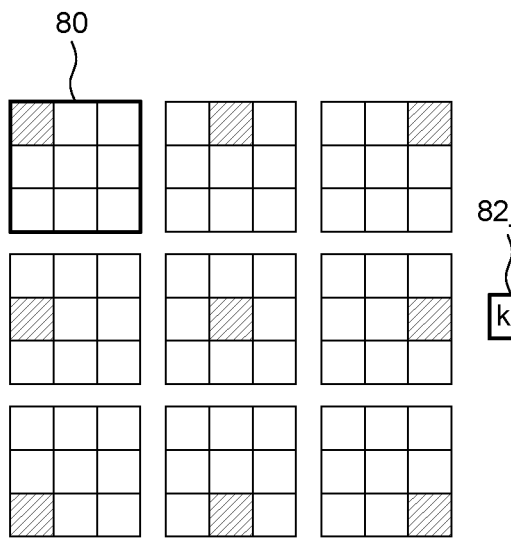 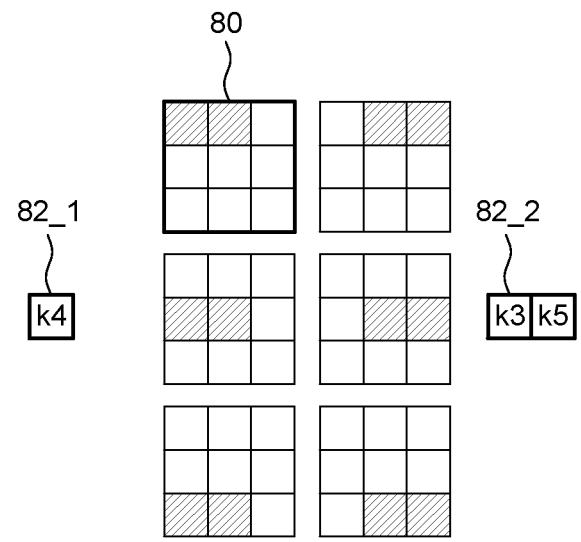
FIG. 8A  FIG. 8B
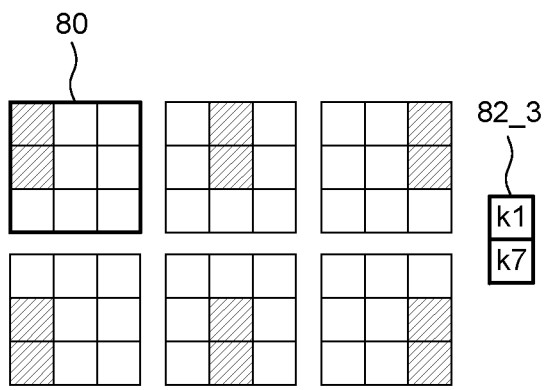 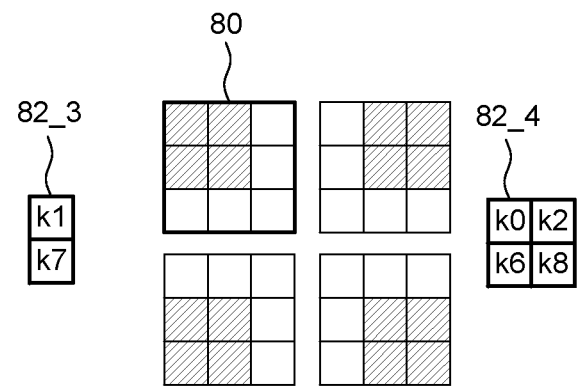
FIG. 8C  FIG. 8D

NEURAL PROCESSING UNIT AND METHOD OF OPERATION THEREOF

CROSS-REFERENCE TO RELATED APPLICATIONS

This application is a continuation of International Application No. PCT/KR2023/009803, filed on Jul. 10, 2023, which claims the benefit of priority to Korean Application No. 10-2022-0084611, filed on Jul. 8, 2022 in the Korean Intellectual Property Office.

BACKGROUND OF THE DISCLOSURE

Technical Field

The present disclosure relates to a neural processing unit (NPU) and a method of operating the same.

Background Art

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. The modeling of the operating principle of biological neurons and the connection relationship between neurons in order to imitate human intelligence is called an artificial neural network (ANN) model. In other words, an artificial neural network is a system in which nodes that imitate neurons are connected in a layer structure.

SUMMARY OF THE DISCLOSURE

These artificial neural network models are classified as "single-layer neural networks" and "multi-layer neural networks" depending on the number of layers.

A typical multi-layer neural network consists of an input layer, a hidden layer, and an output layer. The input layer is a layer that receives external data, and the number of neurons in the input layer is the same as the number of input variables. The hidden layer is located between the input layer and the output layer, receives a signal from the input layer, extracts a feature, and transfers it to the output layer. The output layer receives signals from the hidden layer and outputs them. The input signal between neurons is multiplied by each connection strength having a value between 0 and 1 and then summed. If the sum value is greater than the threshold value of the neuron, the neuron is activated and implemented as an output value through the activation function.

Meanwhile, an artificial neural network in which the number of hidden layers is increased in order to implement higher artificial intelligence is called a deep neural network (DNN).

There are several types of DNNs. For example, it is known that a convolutional neural network (CNN) makes it easy to extract features of input data and identify patterns of the features.

A convolutional neural network (CNN) is a neural network that functions similarly to image processing in the visual cortex of the human brain. Convolutional neural networks are known to be suitable for image processing. Convolutional neural networks may be used for purposes such as classification, object detection, instance segmentation, and image enhancement.

A convolutional neural network is configured in a form in which convolutional channels and pooling channels are repeated. In convolutional neural networks, most of the computation time is occupied by convolutional operations. A convolutional neural network extracts features of an image of each channel through a kernel in the form of a matrix, and recognizes an object in a manner that provides homeostasis such as movement or distortion through pooling. In each channel, a feature map is obtained by convolution of the input data and the kernel, and then an activation function, such as rectified linear unit (ReLU), is applied to generate an activation map for the corresponding channel. Pooling can then be applied. The neural network that actually classifies the pattern is located at the rear end of the feature extraction neural network and is called a fully connected layer. In the operation processing of convolutional neural networks, most operations are performed through convolution or matrix multiplication.

The inventors of the present disclosure recognized the following.

In the case of an artificial neural network model for image enhancement, since the output image is output in the same size as the input image, the channels for the features increase and then decrease again.

In the case of an artificial neural network model for image enhancement, when channels decrease, the length of the width and height of a feature map tends to increase. In addition, in the case of an artificial neural network model for image enhancement, it tends to include a transpose convolution operation.

When performing the transpose convolution operation, the NPU inserts one or more zeros into the feature map and replaces them with a general convolution operation.

In the case of performing a transpose convolution operation using a general convolution operation, a multiply-and-accumulate (MAC) operation for the inserted one or more zeros is accompanied, so latency increases.

In addition, when the transpose convolution operation is performed using a general convolution operation, the amount of unnecessary MAC operation increases because the MAC operation for the inserted one or more zeros is accompanied.

Accordingly, an object of the present disclosure is to provide an apparatus and method for dividing a transpose convolution operation of a feature map into a plurality of different convolutions. Therefore, according to the apparatus and method of the present disclosure, there is an effect that one or more zeros of a feature map in which one or more zeros is inserted may not be calculated.

However, the present disclosure is not limited thereto, and other tasks will be clearly understood by those skilled in the art from the following descriptions.

In order to solve the above problems, a method of operating a neural processing unit according to an example of the present disclosure is provided.

The method comprising determining, by a controller, that an operation performed in a first convolution layer is a transpose convolution operation, dividing, by the controller, a kernel used for the transpose convolution operation into a plurality of sub-kernels, and performing, by at least one processing element, a convolution operation between an input feature map and each of the plurality of sub-kernels in the first convolution layer.

According to an example of the present disclosure, an input of the first convolution layer may be the input feature map, and the input feature map may be a feature map obtained by padding input data with at least one zero.

According to an example of the present disclosure, the method may further include identifying a size of the input data and a size of the input feature map, determining a size of a stride for the plurality of sub-kernels, and determining a size of output data based on at least one of the size of the input feature map or the size of the stride.

According to an example of the present disclosure, the kernel may include at least one weight value, and the at least one weight value may be included in one of the plurality of sub-kernels.

According to an example of the present disclosure, the plurality of sub-kernels may include a first sub-kernel and a second sub-kernel, the first sub-kernel may be determined according to a location of the input data included in a first window when the kernel corresponds to the first window of the input feature map, and the second sub-kernel may be determined according to a location of the input data included in a second window when the kernel corresponds to the second window of the input feature map.

According to an example of the present disclosure, performing, by the at least one processing element, the convolution operation between the input feature map and each of the plurality of sub-kernels in the first convolution layer may include performing a convolution operation between the input feature map and the first sub-kernel in the first convolution layer and performing a convolution operation between the input feature map and the second sub-kernel in the first convolution layer after performing the convolution operation of the input feature map and the first sub-kernel.

According to an example of the present disclosure, the convolution operation between the input feature map and the first sub-kernel may be a convolution operation between the input data included in the input feature map and the first sub-kernel.

According to an example of the present disclosure, an output of the first convolution layer may be an output feature map, and the output feature map may have a larger size than the input data.

According to an example of the present disclosure, the method may further comprise determining, by the controller, the plurality of sub-kernels based on at least one of the size of the input feature map, a size of the output feature map, the at least one zero included in the input feature map, or the location of the input data, the size of the stride, or a size of the kernel.

According to an example of the present disclosure, the method may further comprise mapping, by the controller, the output data included in the output feature map to an address of an internal memory, and storing the output data, by the internal memory, included in the output feature map at the mapped address.

In order to solve the above problems, a neural processing unit according to an example of the present disclosure is provided.

A neural processing unit may include an internal memory configured to store an artificial neural network model, at least one processing element (PE) configured to access the internal memory and to process a convolution operation of the artificial neural network model, and a controller operably connected with the internal memory and the at least one PE, wherein the artificial neural network model may be an artificial neural network-based model configured to perform image enhancement using an image as an input, and the controller may be configured to determine an operation performed in a first convolution layer is a transpose convolution operation, divide a kernel used for the transpose convolution operation into a plurality of sub-kernels, and control the at least one PE so as to perform a convolution operation between an input feature map and each of the plurality of sub-kernels in the first convolution layer.

According to an example of the present disclosure, an input of the first convolution layer may be the input feature map, and the input feature map may be a feature map obtained by padding input data with at least one zero.

According to an example of the present disclosure, the controller may be further configured to identify a size of the input data and a size of the input feature map, determine a size of a stride for the plurality of sub-kernels, and determine a size of output data based on at least one of the size of the input feature map and the size of the stride.

According to an example of the present disclosure, the kernel may include at least one weight value, and the at least one weight value may be included in one of the plurality of sub-kernels.

According to an example of the present disclosure, the plurality of sub-kernels may include a first sub-kernel and a second sub-kernel, wherein the first sub-kernel may be determined according to a location of the input data included in a first window when the kernel corresponds to the first window of the input feature map, and the second sub-kernel may be determined according to a location of the input data included in a second window when the kernel corresponds to the second window of the input feature map.

According to an example of the present disclosure, the controller may be further configured to perform a convolution operation between the input feature map and the first sub-kernel in the first convolution layer, and perform a convolution operation between the input feature map and the second sub-kernel after performing the convolution operation between the input feature map and the first sub-kernel in the first convolution layer.

According to an example of the present disclosure, the convolution operation between the input feature map and the first sub-kernel may be a convolution operation between the input data included in the input feature map and the first sub-kernel.

According to an example of the present disclosure, an output of the first convolution layer may be an output feature map, and the output feature map may have a larger size than the input data.

According to an example of the present disclosure, the controller may be configured to determine the plurality of sub-kernels based on at least one of the size of the input feature map, a size of the output feature map, the at least one zero included in the input feature map, the location of the input data, the size of the stride, and a size of the kernel.

According to an example of the present disclosure, the controller may be configured to map the output data included in the output feature map to an address of an internal memory, and control the internal memory so as to store the output data included in the output feature map at the mapped address.

In order to solve the above problems, a neural processing unit according to an example of the present disclosure is provided.

A neural processing unit may comprise a controller operatively connected to an internal memory, and at least one processing element and the internal memory configured to store one or more instructions executed by the controller. The controller may be configured to execute the instructions to determine that an operation performed in a first convolution layer is a transpose convolution operation, divide a kernel used for the transpose convolution operation into a plurality of sub-kernels, and control a processing element so as to perform a convolution operation between an input feature map and each of the plurality of sub-kernels in the first convolution layer.

According to the present disclosure, a transpose convolution operation of an artificial neural network model for generating a high-resolution image from a low-resolution image may be separated into several types of convolutions and performed.

According to the present disclosure, an operation between unnecessary zeros can be eliminated in a transpose convolution operation of an artificial neural network model for generating a high-resolution image from a low-resolution image.

According to the present disclosure, it is possible to reduce the amount of multiply-and-accumulate (MAC) operations in the transpose convolution operation of an artificial neural network model for generating a high-resolution image from a low-resolution image.

Effects according to the disclosure are not limited by those exemplified above, and more various effects are included in the present disclosure.

BRIEF DESCRIPTION OF THE DRAWINGS

FIGS. 8A-8D are diagrams illustrating a plurality of sub-kernels and corresponding input data according to an embodiment of the present disclosure.

DETAILED DESCRIPTION OF THE EMBODIMENT

Figure 1:
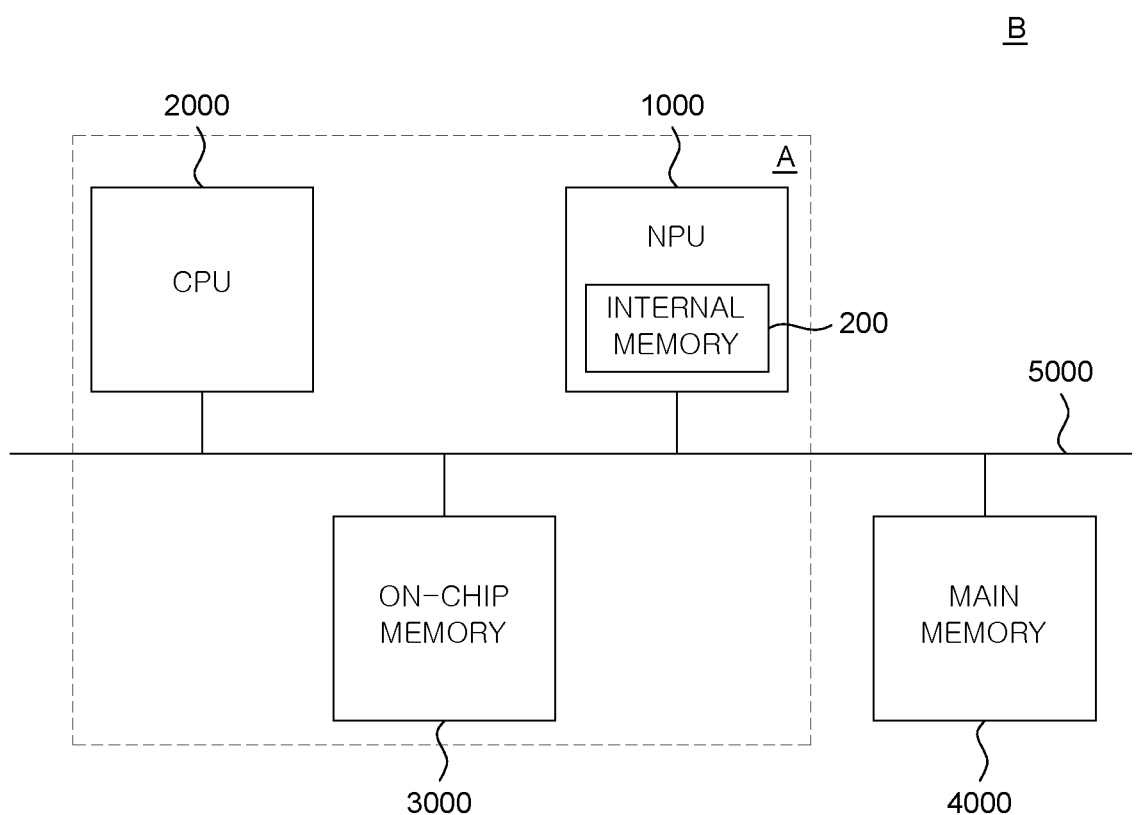
FIG. 1 is a schematic conceptual diagram illustrating an apparatus including a neural processing unit according to an embodiment of the present disclosure.

Specific structural or step-by-step descriptions for examples according to the concept of the present disclosure disclosed in the present specification or application are illustrated only for the purpose of explaining the embodiments according to the concept of the present disclosure.

Embodiments according to the concept of the present disclosure may be implemented in various forms and embodiments according to the concept of the present disclosure which may be implemented in various forms and should not be construed as being limited to the embodiments described in this specification or application.

Embodiments according to the concept of the present disclosure may be applied with various changes and may have various forms, so specific embodiments are illustrated in the drawings and described in detail in the present specification or application. However, this is not intended to limit the embodiments according to the concept of the present disclosure to a specific disclosure form, and should be understood to include all changes, equivalents, or substitutes included in the spirit and technical scope of the present disclosure.

Terms such as first and/or second may be used to describe various elements, but the elements should not be limited by these terms.

The above terms are used only for the purpose of distinguishing one element from another, for example, without departing from the scope of claims according to the concept of the present disclosure, and a first element may be termed a second element, and similarly, the second element may also be referred to as the first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected to" or "directly connected" another element, it should be understood that no other element is present therebetween.

Other expressions describing the relationship between elements, such as "between" and "directly between" or "adjacent to" and "directly adjacent to" should be interpreted similarly.

In this document, expressions such as "A or B," "at least one of A or/and B," or "one or more of A or/and B" may include all possible combinations of the items listed together. For example, "A or B," "at least one of A and B," or "at least one of A or B" may refer to all instances of (1) including at least one A, (2) including at least one B, or (3) including both at least one A and at least one B.

As used herein, expressions such as "first," "second," or "first or second" may modify various elements, regardless of order and/or importance. The expressions are used only to distinguish one element from other elements and do not limit the elements. For example, the first user device and the second user device may represent a different user device regardless of order or importance. For example, without departing from the scope of the claims described in this document, the first element may be named as the second element, and similarly, the second element may also be renamed as the first element.

Terms used in this document are used only describe specific examples, and are not be intended to limit the scope of other examples.

The singular expression may include the plural expression unless the context clearly dictates otherwise. Terms used herein, including technical or scientific terms, may have the same meanings as commonly understood by one having ordinary skill in the art described in this document.

Among the terms used in this document, terms defined in a general dictionary may be interpreted with the same or similar meaning to the meaning in the context of the related art, and unless explicitly defined herein, it should not be construed in an idealistic or overly formal sense. In some cases, even terms defined in this document cannot be construed to exclude examples of this document.

Terms used in this specification are only used to describe specific embodiments, and are not intended to limit the present disclosure.

Singular expressions include plural expressions unless the context clearly dictates otherwise. It should be understood that in this specification, terms such as "comprise" or "having" are intended to indicate that the described feature, number, step, operation, element, part, or combination thereof exists, and it does not preclude the possibility of the presence or addition of one or more other features, numbers, steps, operations, elements, parts, or combinations thereof.

Unless defined otherwise, all terms used herein, including technical or scientific terms, have the same meaning as commonly understood by a person with ordinary skill in the art to which this disclosure pertains. Terms such as those defined in commonly used dictionaries should be interpreted as having a meaning consistent with the meaning in the context of the related art, and unless explicitly defined in this specification, it should not be interpreted in an ideal or excessively formal meaning.

Each feature of the various examples of the present disclosure can be partially or entirely combined or combined with each other, and as can be fully understood by those skilled in the art, various interlocking and driving operations are possible, and each example can be implemented independently of each other or together in a related relationship.

In describing the embodiments, descriptions of technical contents that are well known in the technical field to which the present disclosure pertains and are not directly related to the present disclosure will be omitted. This is to more clearly convey the core of the present disclosure without obscuring it by omitting unnecessary description.

Definition of Terms

Hereinafter, to help understanding of the disclosures presented in this specification, terms used in this specification will be briefly summarized.

NPU: An abbreviation of neural processing unit. It may mean a specialized processor for computation of an artificial neural network model, separate from a central processing unit (CPU). It is also possible to be referring to an artificial neural network accelerator.

Information on the structure of an artificial neural network: This is information including information on the number of layers, the number of nodes in a layer, the value of each node, information on an operation processing method, and information on a weight matrix applied to each node.

Data locality of the artificial neural network model: This information includes all operation sequences and operation types determined by compiling an artificial neural network model when the structure of the trained artificial neural network (ANN) is determined.

DNN: As an abbreviation of deep neural network. It may mean that the number of hidden layers of the artificial neural network is increased in order to implement higher artificial intelligence.

CNN: As an abbreviation for convolutional neural network, it is a neural network that functions similarly to image processing in the visual cortex of the human brain. Convolutional neural networks are known to be suitable for image processing, and are known to make it easy to extract features of input data and identify patterns of features. A weight in a CNN may refer to a kernel of size N×M.

Hereinafter, the present disclosure will be described in detail by describing embodiments of the present disclosure with reference to the accompanying drawings.

FIG. 1 is a schematic conceptual diagram illustrating an apparatus including a neural processing unit according to an embodiment of the present disclosure.

Referring to FIG. 1, a device B including an NPU 1000 includes an on-chip region A. The main memory 4000 may be included outside the on-chip region. The main memory 4000 may be, for example, a system memory such as DRAM. Although not shown, a storage unit including a ROM may be included outside the on-chip region A.

In the on-chip region A, a general-purpose processing unit such as a central processing unit (CPU) 2000, an on-chip memory 3000, and an NPU 1000 are disposed. The CPU 2000 is operably connected to the NPU 1000, the on-chip memory 3000, and the main memory 4000.

However, the device B of the present disclosure may be configured as a standalone device, and in this case, the central processing unit 2000 may be excluded.

However, the present disclosure is not limited thereto, and it is also possible that the NPU 1000 is included in the CPU 2000.

The on-chip memory 3000 is a memory disposed on a semiconductor die and may be a memory for caching separate from the main memory 4000.

For example, the on-chip memory 3000 may be a memory configured to be accessed by other on-chip semiconductors. For example, the on-chip memory 3000 may be a cache memory or a buffer memory.

The NPU 1000 includes an internal memory 200, and the internal memory 200 may include SRAM, for example. The internal memory 200 may be a memory that is substantially used only for operations within the NPU 1000. The internal memory 200 may be referred to as NPU internal memory. Here, "substantial" may mean that the internal memory 200 is configured to store data related to the artificial neural network processed by the NPU 1000. For example, data related to an artificial neural network may be data for an input feature map, a kernel, and/or an output feature map.

For example, the internal memory 200 may be a buffer memory and/or a cache memory configured to store weights, kernels, and/or feature maps necessary for the NPU 1000 operation. However, it is not limited thereto.

For example, the internal memory 200 may be configured with a memory device such as SRAM, MRAM, or a register file that reads and writes faster than the main memory 4000. However, it is not limited thereto.

For example, the internal memory 200 may be configured to include a plurality of memories disposed inside the NPU 1000. For example, the internal memory 200 may be configured to include a first internal memory (not shown) for storing at least one command and/or instructions for controlling the controller, a second internal memory (not shown) for storing scheduling information in which the calculation step of the compiled artificial neural network model is determined, and/or a third internal memory (not shown) configured to store parameters of an artificial neural network model (e.g., input feature map, output feature map, weight, kernel, partial sum, and the like).

The device B including the NPU 1000 may include at least one of an internal memory 200, an on-chip memory 3000, and a main memory 4000.

The "at least one memory" described below is intended to include at least one of the internal memory 200 and the on-chip memory 3000.

In addition, description of the on-chip memory 3000 may be intended to include the internal memory 200 of the NPU 1000 or a memory external to the NPU 1000 but located in the on-chip region A.

However, the internal memory 200 and/or the on-chip memory 3000, which refers to at least one memory, may be distinguished from the main memory 4000 according to bandwidth or bus configuration of the memory rather than locational characteristics.

Generally, the main memory 4000 refers to a memory that easily stores a large amount of data, but has a relatively low memory bandwidth and a relatively high-power consumption.

In general, the internal memory 200 and the on-chip memory 3000 refers to memory that has a relatively high memory bandwidth and relatively low-power consumption, but is inefficient for storing large amounts of data.

Each element of the device B including the NPU 1000 may communicate through the bus 5000. The device B may have at least one bus 5000. The bus 5000 may be referred to as a communication bus and/or a system bus.

The internal memory 200 and the on-chip memory 3000 of the NPU 1000 may further include a separate dedicated bus to ensure a specific bandwidth or more for processing the weights and feature maps of the artificial neural network model.

It is also possible to further provide a separate dedicated bus between the on-chip memory 3000 and the main memory 4000 in order to guarantee more than a certain bandwidth. The specific bandwidth may be determined based on the processing performance of the processing element array of the NPU 1000.

It is also possible to further provide a separate dedicated bus between the internal memory 200 of the NPU 1000 and the main memory 4000 to ensure a specific bandwidth or more. The specific bandwidth may be determined based on the processing performance of the processing element array of the NPU 1000.

The device B including the NPU 1000 may further include a direct memory access (DMA) module to directly control the internal memory 200, the on-chip memory 3000, and/or the main memory 4000.

For example, the DMA module may be configured to directly control data transfer between the NPU 1000 and the on-chip memory 3000 by directly controlling the bus 5000.

For example, the DMA module may be configured to directly control data transfer between the on-chip memory 3000 and the main memory 4000 by directly controlling the bus 5000.

A neural processing unit (NPU) 1000 is a processor specialized to perform an operation for an artificial neural network. NPU 1000 may be referred to as an AI accelerator.

An artificial neural network refers to a network of artificial neurons that multiply and add weights when various inputs or stimuli come in, and transform and transmit the value obtained by adding additional deviations through an activation function. The artificial neural network trained in this way can be used to output an inference result from input data.

The NPU 1000 may be a semiconductor implemented as an electric/electronic circuit. The electric/electronic circuit may mean including a number of electronic devices (e.g., transistors and capacitors). The NPU 1000 may include a processing element (PE) array, an NPU internal memory 200, an NPU controller, a special function unit (SFU), and an NPU interface. Each of the processing element array, the NPU internal memory 200, the NPU scheduler, and the NPU interface may be a semiconductor circuit to which numerous transistors are connected.

Accordingly, some of them may be difficult to discern and distinguish with the naked eye, and may only be identified by operations. For example, an arbitrary circuit may be operated as an array of processing elements, or may be operated as an NPU controller.

The NPU 1000 may include a processing element array, an NPU internal memory 200 configured to store at least a portion of an artificial neural network model that can be inferred from a processing element array, and an NPU controller configured to control the processing element array and the NPU internal memory 200 based on data locality information of the artificial neural network model or information on the structure of the artificial neural network model.

The artificial neural network model may include data locality information or structure information of the artificial neural network model.

The artificial neural network model may refer to an AI recognition model trained to perform an image enhancement function.

The processing element array may perform operations for artificial neural networks. For example, when input data is input, a processing element array can cause an artificial neural network to perform learning. After learning is completed, when input data is input, the processing element array may perform an operation of deriving an inference result through the trained artificial neural network.

For example, the NPU 1000 may load artificial neural network model data stored in the main memory 4000 into the NPU internal memory 200 through the NPU interface. The NPU interface may communicate with the main memory 4000 through the bus 5000.

The NPU controller is configured to control an operation of the processing element array for inference operation of the NPU 1000 and a read and write order of the NPU internal memory 200. The NPU controller is configured to control the order of the convolution operations for each of the input data and a plurality of sub-kernels (or filters). The NPU controller is configured to map each element (or output values, output data) included in the feature map to a corresponding address of the NPU internal memory 200 with respect to the feature map output as a result of convolution operations.

The NPU controller analyzes the structure of the artificial neural network model or receives the structure of the artificial neural network model. Next, the NPU controller sequentially determines the order of operations for each layer. That is, when the structure of the artificial neural network model is determined, the order of operation for each layer may be determined. The order of operations or the order of data flow according to the structure of the artificial neural network model can be defined as the data locality of the artificial neural network model at the algorithm level.

The NPU controller sequentially determines the operation order for each layer by reflecting the structure of the artificial neural network model. That is, when the structure of the artificial neural network model is determined, the order of operation for each layer may be determined. For example, when a transpose convolution operation is performed in a specific convolution layer, the NPU controller may determine an operation order for each sub-layer. When a convolution operation is performed between the input data and each of the plurality of sub-filters, each convolution operation may be defined as an operation performed in a sub-layer.

When the compiler compiles the artificial neural network model so that the artificial neural network model is executed in the NPU 1000, the artificial neural network data locality of the artificial neural network model at the neural processing unit-memory level can be reconstructed. For example, the compiler may be executed by the CPU 2000, an online server, or a separate external system.

Depending on how the NPU 1000 calculates the corresponding artificial neural network model, for example, feature map tiling, stationary technique of processing elements, number of processing elements of the NPU 1000, size of feature maps and weights in the NPU 1000, internal memory capacity, memory hierarchical structure in the NPU 1000, algorithm characteristics of the compiler that determines the order of calculation operations of the NPU 1000 for arithmetic processing of the artificial neural network model, and the like, the calculation method of the artificial neural network model to be processed may be configured differently, even in the case of the same artificial neural network model. This is because the NPU 1000 may differently determine the order of data required at each moment for each clock cycle even if the same artificial neural network model is operated and processed by the above factors.

Figure 2:
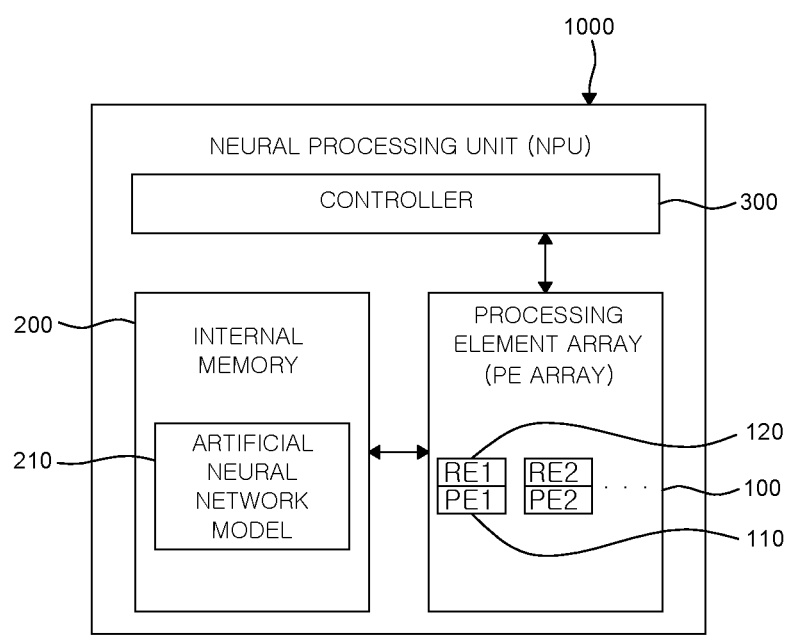
FIG. 2 is a schematic conceptual diagram illustrating a neural processing unit according to an embodiment of the present disclosure.

FIG. 2 is a schematic conceptual diagram illustrating a neural processing unit according to an embodiment of the present disclosure.

The neural processing unit (NPU) 1000 may include a processing element (PE) array 100, an internal memory 200 and/or a controller 300. An artificial neural network model 210 according to an exemplary embodiment of the present disclosure may be stored in the internal memory 200. The processing element array 100 includes a plurality of processing elements. Thus, an array of processing elements may also be referred to as a plurality of processing elements.

The controller 300 may be configured to control the processing element array 100 and the NPU internal memory 200 in consideration of the size of the weight values of the artificial neural network model 210, the size of the feature map, the calculation order of the weight values and/or the feature map, and the like.

The controller 300 may receive the size of the weight values to be calculated in the processing element array 100, the size of the feature map, and the calculation order of the weight values and the feature map. Artificial neural network data that can be included in the artificial neural network model may include node data or feature maps of each layer, and weight data of each connection network connecting nodes of each layer. For example, data related to an artificial neural network that may be included in an artificial neural network model may be data for an input feature map, a kernel, and/or an output feature map.

At least some of the data or parameters of the artificial neural network may be stored in a memory provided inside the controller 300 or the NPU internal memory 200.

The controller 300 may determine that an operation performed in the first convolution layer is a transpose convolution operation. An operation performed in the first convolution layer may be a transpose convolution operation in which the size of a feature (or feature map) increases as the number of channels decreases. In this way, an operation in which a size of a feature increases while decreasing a channel may be referred to as an upscaling operation, an up-convolution operation, or a transpose convolution operation. The controller 300 may determine that an operation performed in a corresponding convolution layer among operations of a plurality of convolution layers is a transpose convolution operation.

The controller 300 may divide a kernel used for the transpose convolution operation into a plurality of sub-kernels. According to an embodiment, the plurality of sub-kernels may include a first sub-kernel, a second sub-kernel, a third sub-kernel, and a fourth sub-kernel. The size of the kernel can be expressed as the product of width and height (width×height). According to one embodiment, the size of the kernel may be 3×3, the size of the first sub-kernel may be 1×1, the size of the second sub-kernel may be 2×1, the size of the third sub-kernel may be 1×2, and the size of the fourth sub-kernel may be 2×2.

The processing element 110 may perform a convolution operation between the input feature map and each of the plurality of sub-kernels in the first convolution layer.

The processing element 110 may perform a convolution operation between the input feature map and the first sub-kernel. The processing element 110 may perform a convolution operation between the input feature map and the second sub-kernel. The processing element 110 may perform a convolution operation between the input feature map and the third sub-kernel. The processing element 110 may perform a convolution operation between the input feature map and the fourth sub-kernel.

A configuration for reducing the MAC operation amount in the NPU 1000 of the present disclosure is to minimize the operation amount in the transpose convolution operation, in particular, by choosing a method that does not operate padded zeros during convolution operation with zero-padded input data, to be described below in FIG. 6.

General CPU scheduling takes into account fairness, efficiency, stability, response time, and the like, and operates to achieve the best efficiency. The CPU is scheduled to perform the most processing within the same time period whilst considering priority, operation time, and the like.

A conventional CPU uses an algorithm for scheduling tasks in consideration of data such as the priority order of each process and operation processing time.

Unlike this, the controller 300 of the NPU 1000 may determine the processing order based on the calculation method of the parameters of the artificial neural network model.

The processing element array 100 is configured to include a plurality of processing elements PE1, PE2, and . . . configured to calculate node data (e.g., feature map) of an artificial neural network and weight data (e.g., kernel) of a network. Each processing element may include a multiply-and-accumulate (MAC) operator and/or an arithmetic logic unit (ALU) operator. However, examples according to the present disclosure are not limited thereto.

Although a plurality of processing elements PE1, PE2, and . . . are illustrated in FIG. 2, it is also possible to substitute a MAC inside one processing element and configure a plurality of multipliers and operators implemented as an adder tree by arranging them in parallel. In this case, the processing element array 100 may also be referred to as at least one processing element including a plurality of operators.

Also, the plurality of processing elements PE1, PE2, and . . . shown in FIG. 2 are merely examples for convenience of explanation, and the number of the plurality of processing elements PE1, PE2, and . . . is not limited. The size or number of the processing element array may be determined by the number of the plurality of processing elements PE1, PE2, and . . . . The size of the processing element array may be implemented in the form of an N×M matrix, where N and M are integers greater than zero. Thus, the processing element array 100 may include N×M processing elements. That is, there may be one or more processing elements.

Also, the processing element array 100 may be configured with a plurality of sub-modules. Accordingly, the processing element array 100 may include a processing element composed of N×M×L sub-modules. More specifically, L is the number of sub-modules of the processing element array, and may be referred to as cores, engines or threads.

The size of the processing element array 100 may be designed whilst considering the characteristics of an artificial neural network model in which the NPU 1000 operates. In other words, the number of processing elements may be determined in consideration of the data size of the artificial neural network model to be operated, the required operating speed, the required power consumption, and the like. The data size of the artificial neural network model may be determined in correspondence with the number of layers of the artificial neural network model and the size of weight data for each layer.

Accordingly, the size of the processing element array 100 according to one example of the present disclosure is not limited. As the number of processing elements PE1 . . . 110 of the processing element array 100 increases, the parallel computing capability of the artificial neural network model that operates increases, but the manufacturing cost and physical size of the NPU 1000 may increase.

For example, the artificial neural network model operated in the NPU 1000 may be an artificial neural network trained to output a low-resolution image as a high-resolution image, that is, an AI model for image enhancement. In this case, the size of the element array 100 may be designed as N×M in consideration of the computational characteristics of the artificial neural network model. In other words, element array 100 may include twelve processing elements. However, it is not limited thereto, and the number of the plurality of processing elements PE1 . . . 110 may be selected within the range of 8 to 16,384, for example. That is, the number of processing elements is not limited in the embodiments of the present disclosure.

The processing element array 100 is configured to perform functions such as addition, multiplication, and accumulation required for artificial neural network operations. In other words, the processing element array 100 may be configured to perform multiplication and accumulation (MAC) operations.

The internal memory 200 may be a volatile memory. Volatile memory may be a memory that stores data only when power is supplied and the stored data disappears when power is cut-off. Volatile memory may include static random access memory (SRAM), dynamic random access memory (DRAM), and the like. The internal memory 200 may preferably be SRAM, but is not limited thereto.

In the following, a convolutional neural network (CNN), which is a type of deep neural network (DNN) among artificial neural networks, will be described in detail.

A convolutional neural network may be a combination of one or several convolutional layers, pooling layers, and fully connected layers. A convolutional neural network has a structure suitable for the learning and inferring of two-dimensional data, and can be learned through a backpropagation algorithm.

In an example of the present disclosure, a convolutional neural network includes a plurality of channels for each layer. For each channel, there is a kernel for extracting features of an input image of the channel. The kernel can be composed of a two-dimensional matrix, and performs convolution operations while traversing the input data. The size of the kernel may be arbitrarily determined, and the stride at which the kernel traverses the input data may also be arbitrarily determined. The degree of matching of the kernels to the entire input data per kernel may be a feature map or an activation map. Hereinafter, a kernel may include one set of weight values or a plurality of sets of weight values.

The processing element array 100 may be configured to process a convolution operation of an artificial neural network, and an activation function operation may be configured to be processed in a separate activation function processing module. In this case, the processing element array 100 may be operated only for convolution operations. In particular, in this case, the processing element array 100 is configured to process only integer-type data, so that it is possible to maximize computational efficiency during a massive convolution operation.

As such, since the convolution operation is an operation consisting of a combination of input data and a kernel, an activation function for adding nonlinearity may be applied thereafter. When an activation function is applied to a feature map resulting from a convolution operation, it may be referred to as an activation map.

Common convolutional neural networks include Alexnet, Squeezenet, VGG16, Resnet152, and Mobilenet, and each artificial neural network model requires 727 mega floating-point operations per second (MFLOPs), 837 MFLOPs, 16 MFLOPs, 11 MFLOPs, 11 MFLOPs, and 579 MFLOPs multiplication times for one inference, respectively, and all weights including the kernel have storage sizes of 233 MB, 5 MB, 528 MB, 230 MB, and 16 MB, respectively. Accordingly, it can be seen that such a convolutional neural network requires a considerable amount of hardware resources and power consumption for calculation.

Figure 3:
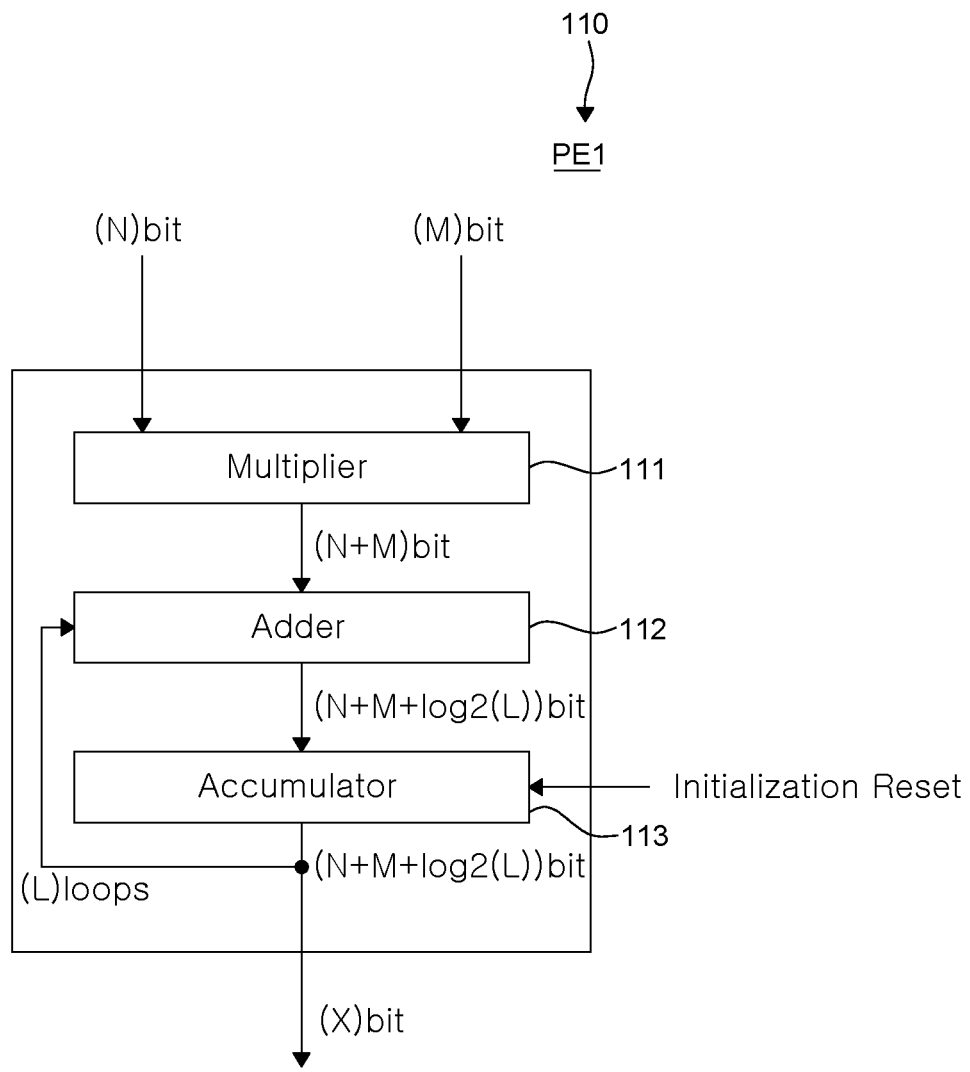
FIG. 3 is a schematic conceptual diagram illustrating one processing element of an array of processing elements that may be applied to the present disclosure.

FIG. 3 is a schematic conceptual diagram illustrating one processing element of a processing element array that may be applied to the present disclosure. In the following, it can be explained with reference to FIG. 2.

Referring to FIG. 2, the processing element array 100 may be configured to perform a MAC operation, and may be configured to quantize and output a result of the MAC operation. However, examples of the present disclosure are not limited thereto. The internal memory 200 may store all or part of the artificial neural network model according to the memory size and the data size of the artificial neural network model.

Referring to FIG. 3, the first processing element PE1 may include a multiplier 111, an adder 112, and an accumulator 113. However, examples according to the present disclosure are not limited thereto, and the processing element array 100 may be modified in consideration of the computational characteristics of the artificial neural network model.

The multiplier 111 multiplies the received (N) bit data and (M) bit data. The operation value of the multiplier 111 is output as (N+M) bit data, where N and M are integers greater than zero. The first input unit for receiving (N) bit data may be configured to receive a value having a variable-like characteristic (e.g., input feature map) and the second input unit for receiving (M) bit data may be configured to receive a value having characteristics such as a constant (e.g., weights that have been trained). However, input data to the multiplier 111 is not limited to constant values and variable values.

Meanwhile, the first processing element PE1 110 may limit an operation so that the multiplier 111 does not perform an operation when zero is input to one of the first input unit and the second input unit of the multiplier 111 since it recognizes that the result of the operation is zero even if it does not perform the operation.

For example, when zero is input to one of the first input unit and the second input unit of the multiplier 111, the multiplier 111 may be configured to operate in a zero-skipping method.

Data input to the first input unit and the second input unit of the multiplier 111 may have bit widths determined according to quantization of node data and weight data of each layer of the artificial neural network model. For example, when node data of the first layer is quantized to 5-bits and weight data of the first layer is quantized to 7-bits, the first input unit may be configured to receive 5-bit data, and the second input unit may be configured to receive 7-bit data.

Referring to FIGS. 2 and 3, the NPU 1000 may control the first processing element PE1 so that the quantized bit width is converted in real time when the quantized data stored in the internal memory 200 is input to the input units of the first processing element PE1.

The adder 112 adds the calculated value of the multiplier 111 and the calculated value of the accumulator 113. When (L) loops is equal to zero, since there is no accumulated data, the operation value of the adder 112 may be the same as the operation value of the multiplier 111. When (L) loops is equal to one, a value obtained by adding the operation value of the multiplier 111 and the operation value of the accumulator 113 may be equal to the operation value of the adder.

The accumulator 113 temporarily stores data output from the output unit of the adder 112 so that the operation value of the adder 112 and the operation value of the multiplier 111 are accumulated by the number of (L) loops. Specifically, the operation value of the adder 112 output from the output of the adder 112 is input to the input of the accumulator 113, and the input operation value is temporarily stored in the accumulator 13 and then output from the output unit of the accumulator 113. The outputted operation value is input to the input unit of the adder 112 through a loop. At this time, the operation value newly output from the output unit of the multiplier 111 is also input to the input unit 112 of the adder. That is, the operation value of the accumulator 113 and the new operation value of the multiplier 111 are input to the input unit of the adder 112, and these values are added by the adder 112 and output through the output unit of the adder 112. The data output from the output unit of the adder 112, that is, the new operation value of the adder 642 is input to the input unit of the accumulator 113, and subsequent operations are performed as many times as the number of loops substantially the same as the above operations.

As such, since the accumulator 113 temporarily stores the data output from the output unit of the adder 112 in order to accumulate the operation value of the multiplier 111 and the operation value of the adder 112 by the number of loops, the data input to the input unit of the accumulator 113 and data output from the output unit may have the same (N+M+log 2(L)) bit width as the data output from the output unit of the adder 112, where L is an integer greater than zero.

When the accumulation is completed, the accumulator 113 may receive an initialization reset to initialize the data stored in the accumulator 113 to 0. However, examples according to the present disclosure are not limited thereto.

The output data (N+M+log 2(L)) bits of the accumulator 113 may be node data of the next layer or input data of convolution.

Figure 4:
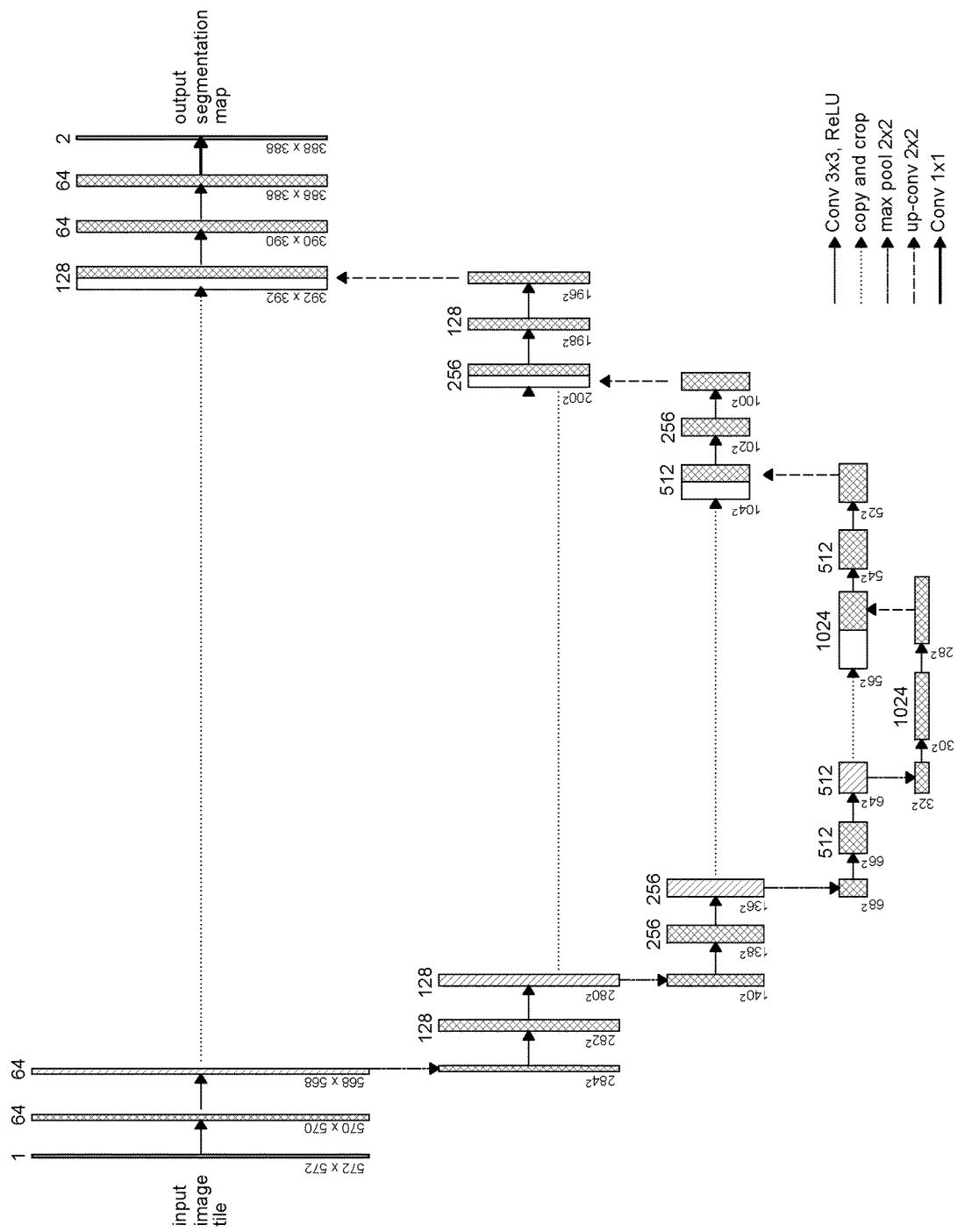
FIG. 4 is a schematic diagram illustrating the structure of an artificial neural network according to an embodiment of the present disclosure.

FIG. 4 is a schematic diagram showing the structure of an artificial neural network model according to an embodiment of the present disclosure.

FIG. 4 shows the size of parameters of an artificial neural network model according to an embodiment of the present disclosure for each layer. The artificial neural network model may have an encoder-decoder-based convolution neural network structure. In an embodiment, the artificial neural network model may refer to an artificial neural network model configured to process image enhancement.

Referring to FIG. 4, the artificial neural network model may include a contracting path and an expanding path. A contracting path refers to a path that reduces the dimensionality of an image while increasing the number of channels so as to capture features of the input image. An expanding path refers to a path that restores a high-dimensional image while reducing the number of channels and increasing the dimensionality of the image. The expanding path reconstructs a high-dimensional image by using a method of concatenating low-dimensional encoded information with each layer in a decoding step (that is, a method of directly connecting the layer of the contracting path and the layer of the expanding path (skip connection)).

In one embodiment, an input image tile having a size of 572×572×1 may be input to the artificial neural network. The entire image may be input to the artificial neural network model or may be input by dividing the image into image tiles that are part of the image, and the present disclosure is not limited to the type of the input image. 572×572 means the dimension of the map, and 1 means the number of channels. That is, an input image tile having one channel and having a size of 572×572 may be input to the artificial neural network model.

When an input image tile is input, a 3×3 convolution operation, a ReLU activation function, and Max pooling may be repeatedly applied.

An expanding path may include a plurality of transpose convolution operations. In an embodiment, the transpose convolution operation may be a 2×2 up-convolution (up-conv 2×2). For example, in an arbitrary convolution layer, a feature map with a size of 100×100×256 may be output as a feature map with a size of 200×200×128 by performing a 2×2 up-convolution (up-conv 2×2) operation.

In order to obtain a higher resolution image, since the output image must have the same size as or at least the same size as the input image, a transpose convolution operation performed while expanding the feature map in the expanding path is required.

The transpose convolution operation can be performed by inserting one or more zeros into the feature map and replacing it with a general convolution operation.

In FIGS. 5A-5D below, a transpose convolution performed by inserting one or more zeros into a feature map and replacing it with a general convolution operation will be described.

FIGS. 5A-5D are diagrams illustrating a transpose convolution operation according to a comparative example of the present disclosure.

FIGS. 5A-5D show input data, an input feature map 51, a kernel 52, and an output feature map 53. The input data, the input feature map 51, the kernel 52, and the output feature map 53 may each be composed of a two-dimensional matrix (N×M, where N and M are positive integers).

In an embodiment, the input data includes element data a, and may be 3×3 in size. The input feature map 51 for the input data may be input data padded with one or more zeros and may have a size of 7×7. Kernel 52 may be 3×3 in size. The output feature map 53 includes element data b and may have a size of 5×5. Element data included in the output feature map 53 may be referred to as 'output data'.

Referring to FIGS. 5A to 5D, in an arbitrary convolution layer, the kernel 52 may perform a convolution operation while traversing the input feature map 51. That is, the convolution operation is calculated while moving the window of the kernel 52 at regular intervals. A window means an area of a specified size, and may mean an area on an input feature map corresponding to a kernel size during a convolution operation. In an embodiment, a stride at which the kernel 52 traverses the input feature map 51 may be set to 1.

Figure 5A:
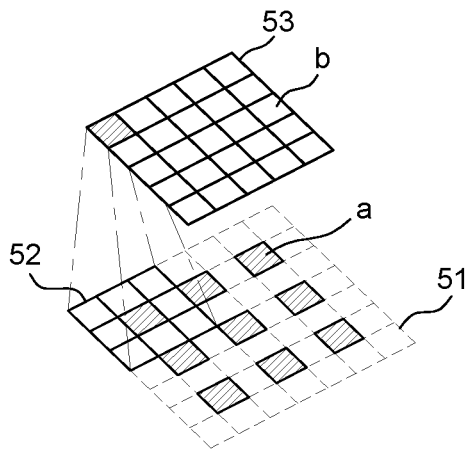
FIGS. 5A-5D are diagrams illustrating a transpose convolution operation according to a comparative example of the present disclosure.
Figure 5B:
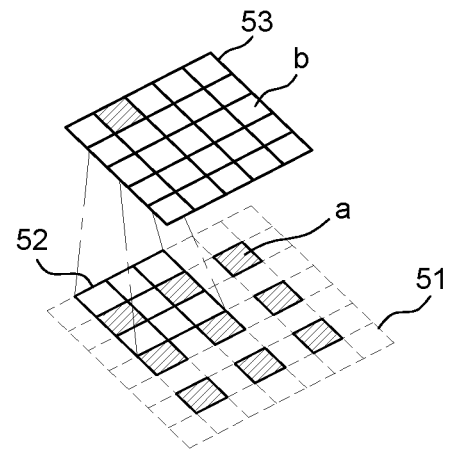
Figure 5C:
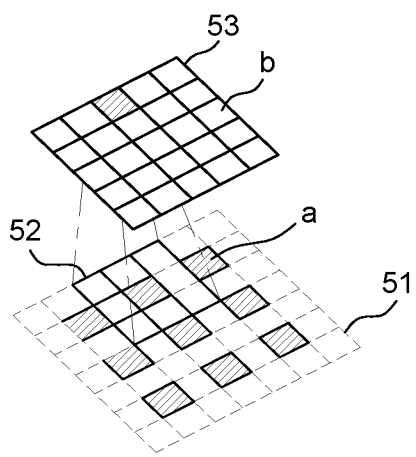
Figure 5D:
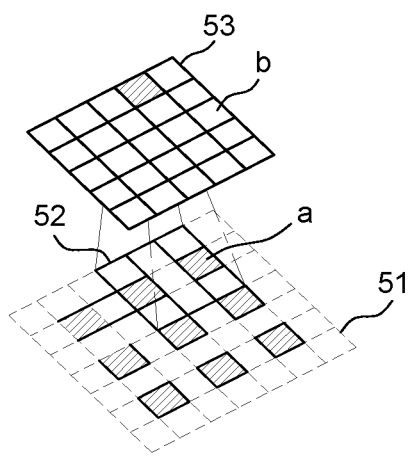

In the case of performing a transpose convolution operation using a general convolution operation according to this comparative example, a MAC operation for inserted one or more zeros is accompanied. Referring to FIG. 5A, when performing a convolution operation between the nine-element data of the input feature map 51 and the kernel 52, eight operations correspond to the MAC operation for one or more zeros. Regardless of the kernel 52, since the output value for the operation with zero is zero, the MAC operation for the inserted one or more zero(s) corresponds to an unnecessary MAC operation amount.

According to the method of operating an artificial neural network according to an embodiment of the present disclosure, it is possible to minimize the MAC operation amount in a transpose convolution operation by not calculating padded zeros in a convolution operation with a zero-padded input feature map.

The MAC operation may be performed in processing element 110.

Figure 6:
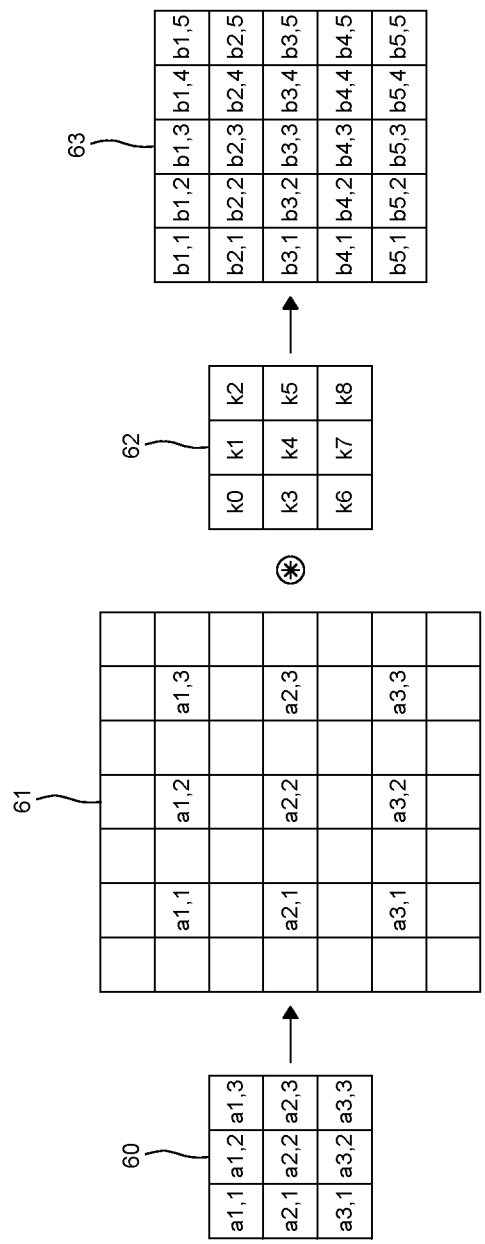
FIG. 6 is a schematic diagram illustrating a transpose convolution operation according to an embodiment of the present disclosure.

FIG. 6 is a schematic diagram illustrating a transpose convolution operation according to an embodiment of the present disclosure.

Referring to FIG. 6, in an arbitrary convolution layer, after padding the input image with zero, a transpose convolution operation is shown in which features of the image are extracted while searching the zero-padded input image using a specific kernel, and the extracted features are generated as a feature map.

The input image or input data 60 may include a plurality of element data or pixels a1,1 to a3,3. The input image may be 3×3 in size.

In the transpose convolution operation according to an embodiment of the present disclosure, the input image 60 may be zero-padded. Zero padding is to make the size of the feature map output after the convolution operation greater than or equal to the input image by adding pixels filled with zero values between element data and/or at the edges of the input image.

The zero-padded input image 61 may have a size of 7×7. The zero-padded input image 61 may be referred to as an "input feature map."

Features can be extracted by performing a convolution operation while the 3×3 kernel 62 traverses the input feature map 61 at a stride value of one. Features extracted while the 3×3 kernel 62 traverses the input feature map 61 at a stride value of one may be expressed as b1,1 to b5,5. The extracted features may be output as an output feature map 63 having a size of 5×5.

Figure 7:
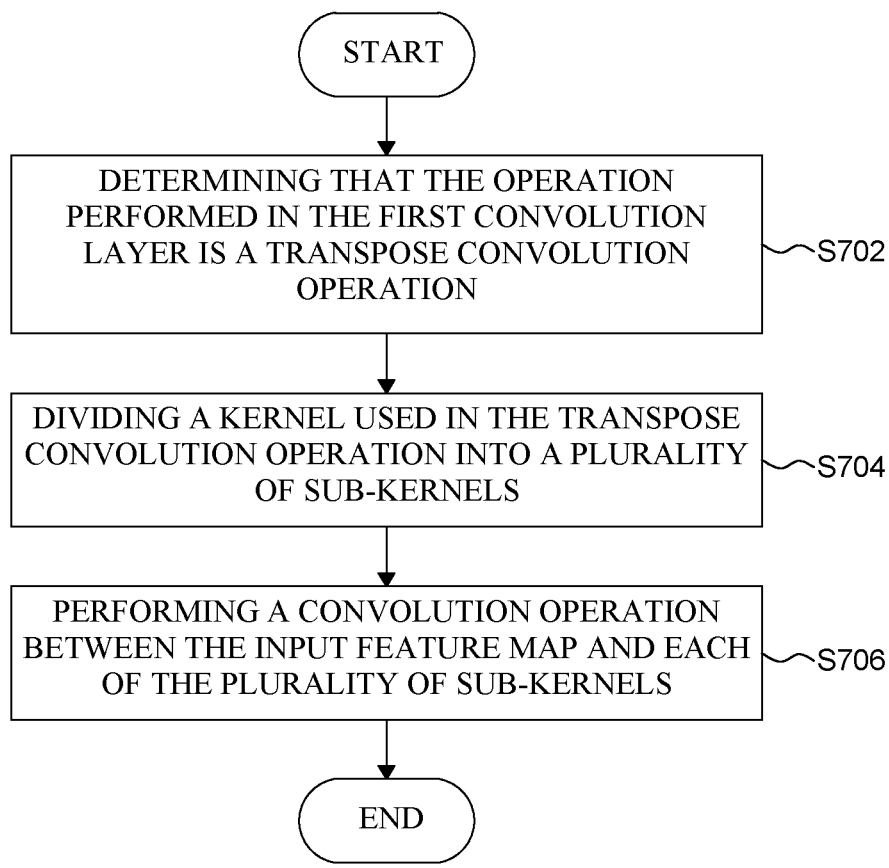
FIG. 7 is a flowchart illustrating how a neural processing unit operates according to an embodiment of the present disclosure.

FIG. 7 is a flowchart illustrating how a neural processing unit operates according to an embodiment of the present disclosure. FIGS. 8A-8D are diagrams illustrating a plurality of sub-kernels and corresponding input data according to an embodiment of the present disclosure. Hereinafter, it is explained with reference to FIGS. 6 and 9.

Referring to FIG. 7, the neural processing unit (or controller) may determine that the operation performed in the first convolution layer is a transpose convolution operation (S702).

The neural processing unit or controller may identify the size of the input data and/or the size of the input feature map.

The neural processing unit (or controller) may divide a kernel used in the transpose convolution operation into a plurality of sub-kernels (S704).

An input of the first convolution layer is an input feature map having a constant size, and the input feature map may be a feature map obtained by padding input data with at least one zero.

Referring to FIGS. 6 and 8, the kernel 62 may be divided into four sub-kernels 82_1, 82_2, 82_3, and 82_4 by a neural processing unit (or controller). Kernel 62 may include weight values k0 to k8. Weight values included in the kernel are included in one of the four sub-kernels 82_1, 82_2, 82_3, and 82_4. That is, a plurality of sub-kernels 82_1, 82_2, 82_3, and 82_4 may be separately set in such a way that the weight value included in the kernel is necessarily included in one of the plurality of sub-kernels 82_1, 82_2, 82_3, and 82_4, but not overlapped. However, the method of dividing into a plurality of sub-kernels is not limited thereto.

In an embodiment, the four sub-kernels may be referred to as a first sub-kernel 82_1, a second sub-kernel 82_2, a third sub-kernel 82_3, and a fourth sub-kernel 82_4.

The first sub-kernel 82_1 may be determined according to the location of the input data included in the first window when the kernel corresponds to the first window of the input feature map.

Figure 9:
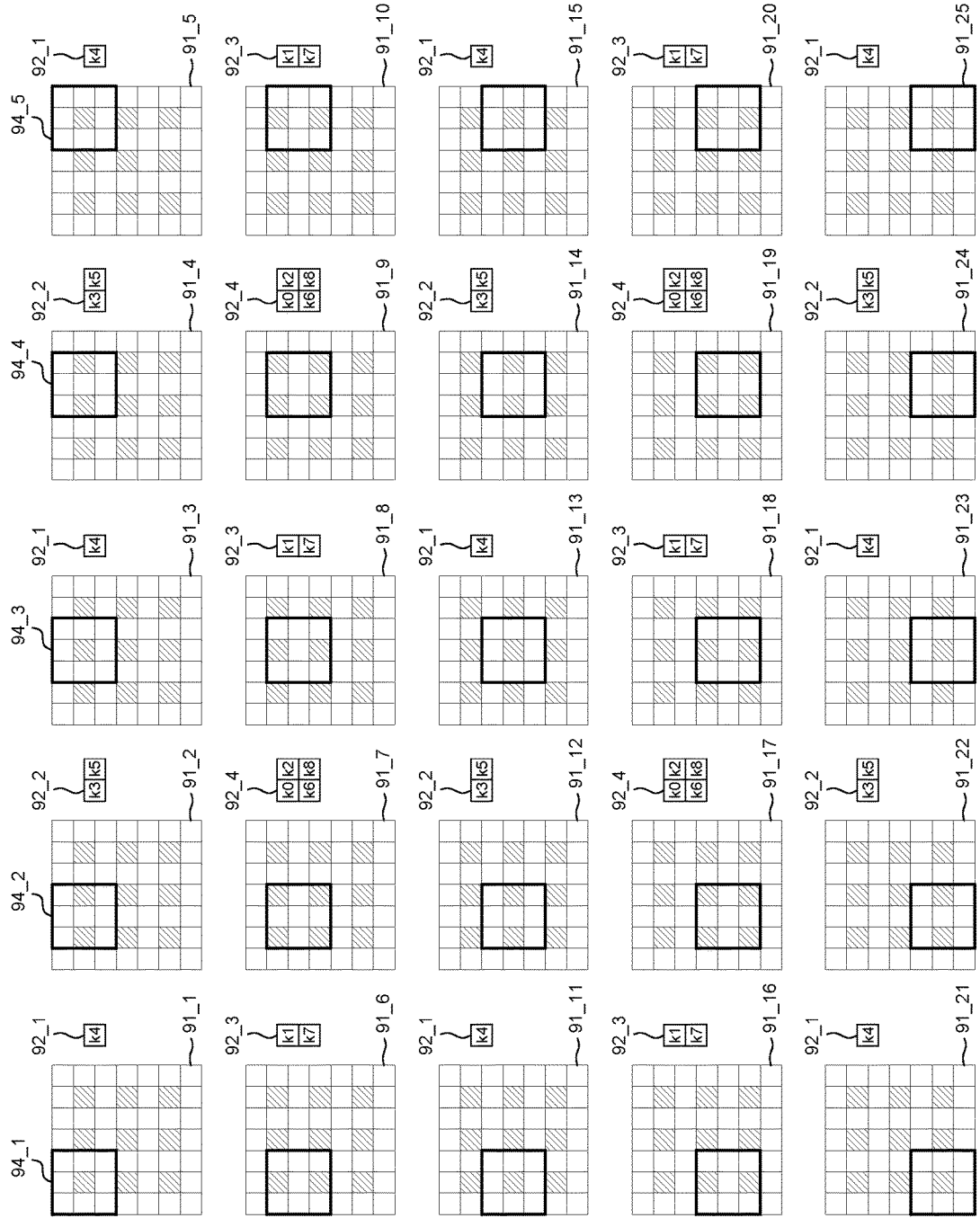
FIG. 9 is a schematic diagram illustrating a convolution operation performed using a plurality of sub-kernels in a neural processing unit according to an embodiment of the present disclosure.

Referring to FIGS. 6 and 9, when the kernel 62 corresponds to the first window 94_1 of the input feature map 91_1, that is, when a convolution operation is performed between the first window 94_1 of the input feature map 91_1 and the kernel 62, the input data included in the first window 94_1 is a1,1 and corresponds to k4 of the kernel 62. At this time, the first sub-kernel 82_1 may be configured of k4. Thus, the convolution operation of the input feature map 91_1 and the first sub-kernel 82_1 may be a convolution operation between the input data a1, 1, included in the input feature map 91_1, and the first sub-kernel 82_1. That is, the first sub-kernel 82_1 is determined so that the convolution operation between the input feature map 91_1 and the first sub-kernel 82_1 does not include an operation with one or more zero(s) included in the input feature map 91_1.

The second sub-kernel 82_2 may be determined according to the location of the input data included in a specific window when the kernel corresponds to the second window of the input feature map.

Referring to FIGS. 6 and 9, when the kernel 62 corresponds to the second window 94_2 of the input feature map 91_1, that is, when a convolution operation is performed between the second window 94_2 of the input feature map 91_1 and the kernel 62, the input data included in the second window 94_2 are a1,1 and a1,2, and correspond to k3 and k5 of the kernel 62, respectively. At this time, the second sub-kernel 82_2 may be composed of k3 and k5. Thus, the convolution operation of the input feature map 91_2 and the second sub-kernel 82_2 may be a convolution operation between the input data a1,1 and a1,2 included in the input feature map 91_1 and the second sub-kernel 82_2. That is, the second sub-kernel 82_2 is determined so that the convolution operation between the input feature map 91_1 and the second sub-kernel 82_2 does not include an operation with one or more zeros included in the input feature map 91_1.

Since the third sub-kernel 82_3 and the fourth sub-kernel 82_4 may be configured in a similar manner to the above-described first sub-kernel 82_1 or the second sub-kernel 82_2, they are omitted below.

The neural processing unit or controller may determine the size of the stride for the plurality of sub-kernels.

The neural processing unit or controller may determine the size of the output data based on at least one of the sizes of the input feature map and the size of the stride.

The neural processing unit or controller may determine a plurality of sub-kernels based on at least one of the size of the input feature map, the size of the output feature map, the location of at least one zero, input data included in the input feature map, the size of the stride, and the size of the kernel.

Referring back to FIG. 7, the neural processing unit or controller may perform a convolution operation between the input feature map and each of the plurality of sub-kernels in the first convolution layer (S706).

The neural processing unit or controller may control the order of the convolution operation for each of the input feature map and a plurality of sub-kernels.

After performing a convolution operation between the input feature map and the first sub-kernel in the first convolution layer, the neural processing unit or controller may perform a convolution operation between the input feature map and the second sub-kernel.

An output of the first convolution layer, which is output as a result of performing a convolution operation between the input feature map and each of the plurality of sub-kernels in the first convolution layer, is an output feature map having a certain size. The output feature map may have a larger size than the input data.

The neural processing unit or controller may map output data included in the output feature map to an address of internal memory. The internal memory may store output data included in the output feature map at the mapped address.

FIG. 8A represents element data of the input data 80 for which element-wise multiplication is performed with the first sub-kernel 82_1 when the convolution operation is performed nine times for the input feature map with first sub-kernel 82_1 traversing by stride value of two. According to the first sub-kernel 82_1 and according to an embodiment of the present disclosure, there is an effect that the zero padded input feature map may not be operated with respect to a convolution operation between the zero-padded input feature map and the first sub-kernel 82_1.

FIG. 8B represents element data of the input data 80 for which element-wise multiplication is performed with the second sub-kernel 82_2 when the convolution operation is performed six times for the input feature map with first sub-kernel 82_1 traversing by stride value of two. According to the second sub-kernel 82_2 according to an embodiment of the present disclosure, there is an effect that the zero padded input feature map may not be operated with respect to a convolution operation between the zero-padded input feature map and the second sub-kernel 82_2.

FIG. 8C represents element data of the input data 80 for which element-wise multiplication is performed with the third sub-kernel 82_3 when the convolution operation is performed six times for the input feature map with third sub-kernel 82_3 traversing by stride value of two. According to the third sub-kernel 82_3 according to an embodiment of the present disclosure, there is an effect that the zero padded input feature map may not be operated with respect to a convolution operation between the zero-padded input feature map and the third sub-kernel 82_3.

FIG. 8D represents element data of the input data 80 for which element-wise multiplication is performed with the fourth sub-kernel 82_4 when the convolution operation is performed 4 times for the input feature map with fourth sub-kernel 82_4 traversing by stride value of two. According to the fourth sub-kernel 82_4 according to an embodiment of the present disclosure, there is an effect that the zero padded input feature map may not be operated with respect to a convolution operation between the zero-padded input feature map and the fourth sub-kernel 82_4.

As it is divided into a plurality of sub-kernels 92_1 to 92_4 by the neural processing unit or controller, the convolution operation of the first convolution layer can be divided into a first type convolution operation corresponding to FIG. 8A, a second type convolution operation corresponding to FIG. 8B, a third type convolution operation corresponding to FIG. 8B, and a fourth type convolution operation corresponding to FIG. 8D.

According to the transpose convolution operation method of the neural processing unit in reference to an embodiment of the present disclosure, the padded one or more zeros operation can be omitted and the latency can be reduced by ¼ by classifying and performing the convolution operation by stride value of two into four types.

FIG. 9 is a schematic diagram illustrating a convolution operation performed using a plurality of sub-kernels in a neural processing unit according to an embodiment of the present disclosure. In the following, it is explained with reference to FIGS. 6 and 8A-8D.

Referring to FIGS. 6 and 9, a process of performing twenty-five times of convolution operations and outputting an output feature map 63 having a size of 5×5, by using a 7×7 size of zero-padded input feature maps 91_1 to 91_25 from a 3×3 size of an input data with a plurality of sub-kernels 92_1 to 92_4, is shown.

Referring to FIGS. 8A-8D and 9, the first type of convolution operation corresponding to FIG. 8A corresponds to the convolution operation performed with the input feature map 91_1, 91_3, 91_5, 91_11, 91_13, 91_15, 91_21, 91_23, and 91_25 while the first sub-kernel 92_1 traverses by stride value of two in FIG. 9.

In addition, the second type of convolution operation corresponding to FIG. 8B corresponds to the convolution operation performed with the input feature map 91_2, 91_4, 91_12, 91_14, 91_22, and 91_24 while the second sub-kernel 92_2 traverses by stride value of two in FIG. 9.

The third type of convolution operation corresponding to FIG. 8C corresponds to the convolution operation performed with the input feature map 91_6, 91_8, 91_10, 91_16, 91_18, and 91_20 while the third sub-kernel 92_3 traverses by stride value of two in FIG. 9.

The fourth type of convolution operation corresponding to (d) of FIG. 8 corresponds to the convolution operation performed with the input feature map 91_7, 91_9, 91_17, and 91_19 while the fourth sub-kernel 92_4 traverses by stride value of two in FIG. 9.

As shown in FIG. 9, if a convolution operation is performed between the input feature map 91_1 to 91_25 and one of the plurality of sub-kernels 92_1 to 92_4 in a specific window, one piece of output data of the output feature map may be output.

As an example, referring to FIGS. 6 and 9, when the convolution operation is performed on the input feature map 91_1 and the first sub-kernel 92_1 in a specific window, one output data b1,1 of the output feature map 63 can be output.

Referring to FIGS. 6 and 9, when the input feature map 91_1 to 91_25 performs a convolution operation with one of the plurality of sub-kernels 92_1 to 92_4 for all windows, all of the output data b1,1 to b5,5 of the output feature map or the 5×5 output feature map 63 may be output.

Figures 10A, 10B, 10C:
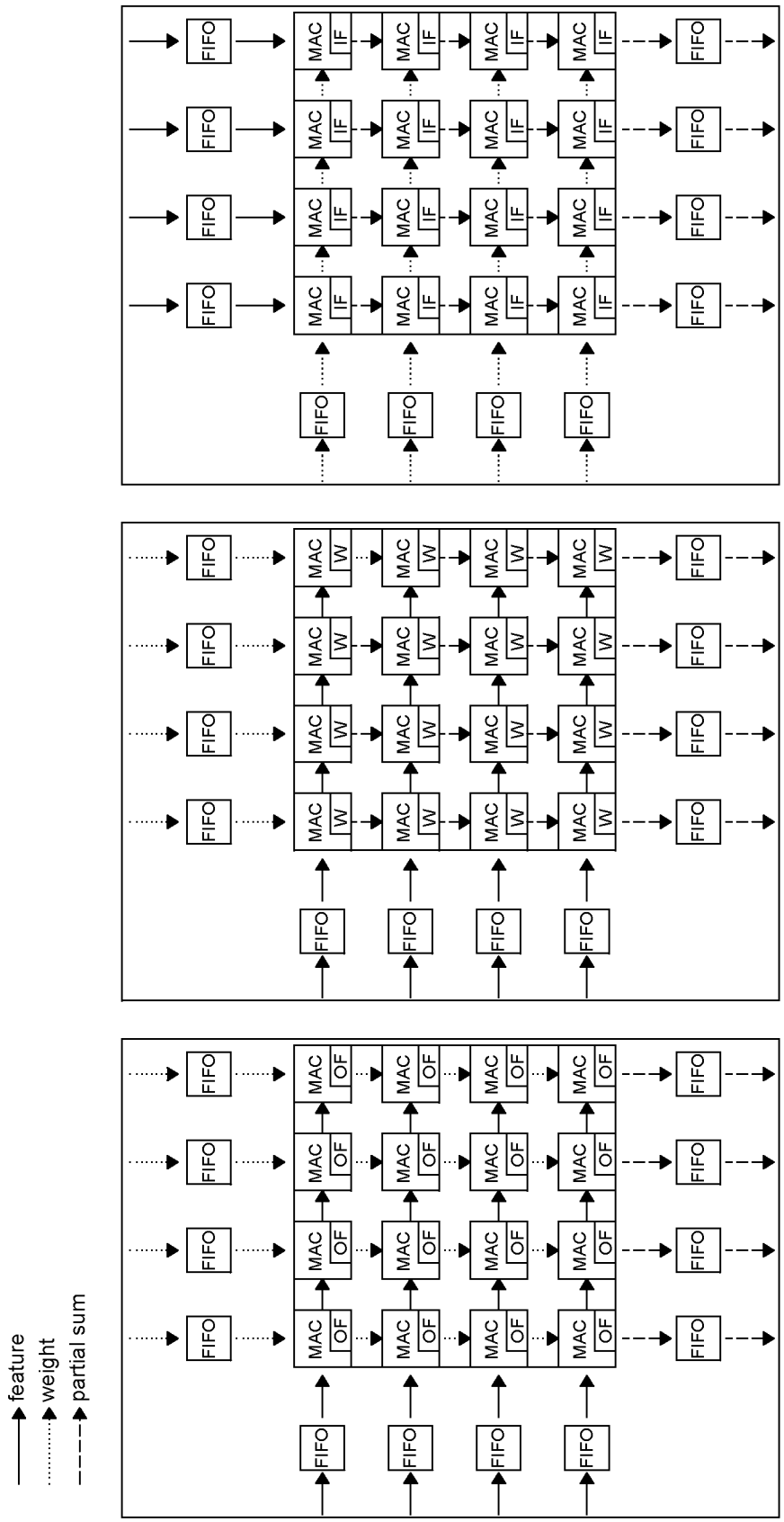
FIGS. 10A-10C are diagrams showing systolic array structures according to a comparative example of the present disclosure.

FIGS. 10A-10C are diagrams showing systolic array structures according to a comparative example of the present disclosure.

FIGS. 10A-10C show comparative examples of a systolic array structure of an NPU according to a stationary technique of a processing element. An NPU having a systolic array structure may include a processing element array including a plurality of processing elements that perform MAC operations. The systolic array structure means a structure that reuses data and operates in parallel, and this method can be referred to as dataflow. It can be divided into three types according to which values are stored in the local memory of each processing element.

According to the systolic array structure, the data used in any processing element can be transferred to the next processing element positioned above, below, or right without the need to import data from a register file, and the corresponding data can be used immediately in the next processing element.

Referring to FIG. 10A, a systolic array structure according to output stationary (OS) mode is shown.

In the systolic array according to the output stationary (OS) technique, both feature values and weight values can be reused such that a structure that can be reused by storing an output feature map (OF), that is, a partial sum, in the local memory of each PE. A feature value of each processing element and a weight value included in a kernel may be loaded through a FIFO. Each processing element may perform a MAC operation using a feature value and a weight value. At this time, the calculated partial sum may be stored in each processing element, and the partial sum generated may be accumulated thereafter.

Here, the feature value may refer to a parameter constituting the feature map.

Referring to FIG. 10B, the systolic array structure according to the weight stationary (WS) mode is shown.

The systolic array according to the weight stationary technique stores weight values in the local memory of each PE and is a structure that can be reused during convolution operations. According to the weight stationary technique, energy consumption when reading weight values can be minimized by minimizing the fetching of weight values from DRAM. Feature values for each processing element may be loaded through FIFOs. Weights are pre-loaded into the array of processing elements and after the weights are mapped onto the processing element array, the convolution operation may be performed in a manner in which input data to be calculated with the corresponding weights are continuously fed from the leftmost column. At this time, the input data (feature) is shifted from left to right every cycle inside the systolic array, and the computed partial sum can be passed to the processing element from top to bottom for every cycle.

Referring to FIG. 10C, the systolic array structure according to the input stationary (IS) mode is shown.

The systolic array structure according to the input stationary (IS) technique has the same tensor flow as the systolic array structure according to the weight stationary technique. However, unlike the systolic array structure according to the weight stationary technique, it is a structure that can be reused by storing the input feature map (IF) in the local memory of each PE.

The systolic array structure according to each stationary mode can show a significant difference in calculation time depending on the type of and characteristics of the artificial neural network. This is because the height, width, depth, and channels of input and weights vary according to the layer type of the artificial neural network.

For example, in a layer with a small number of channels, when a systolic array structure according to the output stationary technique is used, MAC utilization may be remarkably low. In a layer with a small number of channels, if the systolic array structure according to the input stationary mode is used instead of the systolic array structure according to the output stationary method, MAC utilization can be increased.

In the case of using a fixed NPU with a systolic array structure according to output stationary mode, when using an artificial neural network model for image enhancement that requires a path to restore a high-dimensional image while reducing the number of channels and increasing the dimensionality of the image, since the MAC utilization rate is remarkably low, it may be necessary to improve dataflow to solve such problem.

According to a method of operating a neural processing unit and according to an embodiment of the present disclosure, according to the characteristics of each layer of the artificial neural network, the MAC operation time in the processing element array may be calculated, and the MAC operation structure may be switched for each layer based on the calculated MAC operation time. The computation time calculation may be performed in the compilation step of the artificial neural network model. However, it is not limited thereto.

According to a method of operating a neural processing unit and according to another embodiment of the present disclosure, according to the characteristics of input feature map of the artificial neural network, the MAC operation time in the processing element array may be calculated, and the MAC operation structure may be switched for each tile or patch of input feature map based on the calculated MAC operation time. The computation time calculation may be performed in the compilation step of the artificial neural network model. However, it is not limited thereto.

The characteristics of each layer of the artificial neural network may include the shape of an input feature map (IF) and/or weight. The shape of an input feature map (IF) and/or weight may be determined by height, width, depth, and channel.

The input feature map of the artificial neural network can be divided into a plurality of small tiles, and each tile can extract features through an operation with a kernel. Systolic array structures capable of minimizing the MAC operation time for each tile may vary.

The MAC operation structure of the processing element array of the neural processing unit may be one of a systolic array structure according to an input stationary mode, a systolic array structure according to an output stationary mode, and a systolic array according to a weight stationary mode.

In convolutional neural networks, most of the computation time is occupied by convolution operations. The number of MAC operations for the convolution operation can be calculated by an algorithm such as Equation 1 below.

---
Equation 1

```
for (m=0; m<M; m++)           // Num filters
  for (e=0; e<E; e++)         // num_conv_window(height)
    for (f=0; f<F; f++)       // num_conv_window(width)
      for (c=0; c<C; c++)     // Elements per filter(channel)
        for (r=0; r<R; r++)   // Elements per filter(height)
          for (s=0; s<S; s++) // Elements per filter(width)
          {
            output[m][e][f] = input[c][e+r][f+s] * weight[m][c][r][s]
            time = time + 1;
          }.
```
---

Referring to Equation 1, each variable is represented such that m is the number of filters, e is the height of the output feature map, f is the width of the output feature map, c is the number of channels, r is the filter height, and s is the filter width. Each constant is represented such that M is the number of filters, E is the height of the output feature map, F is the width of the output feature map, C is the number of channels, R is the filter height, and S is the filter width.

The algorithm according to Equation 1 can calculate different for-loops in parallel according to each stationary technique. In the case of a systolic array structure according to the output stationary mode, loop-unrolling may be performed on the first to third for-loops in the algorithm according to Equation 1. Specifically, in case of a systolic array structure according to the output stationary mode, calculation can be performed for the first for-loop (Num filters) in parallel by the number of rows of the processing element array, and calculation can be performed for the second for-loop (num_conv_window (height)) and the third for-loop (num_conv_window (width)) in parallel as many times as the number of columns in the processing element array.

Assuming that the MAC operation with the input feature map and one kernel as input is one cycle, the neural processing unit, according to an embodiment of the present disclosure, may calculate the total MAC operation time using the number of processing elements, input feature map, and/or weight.

Figure 11:
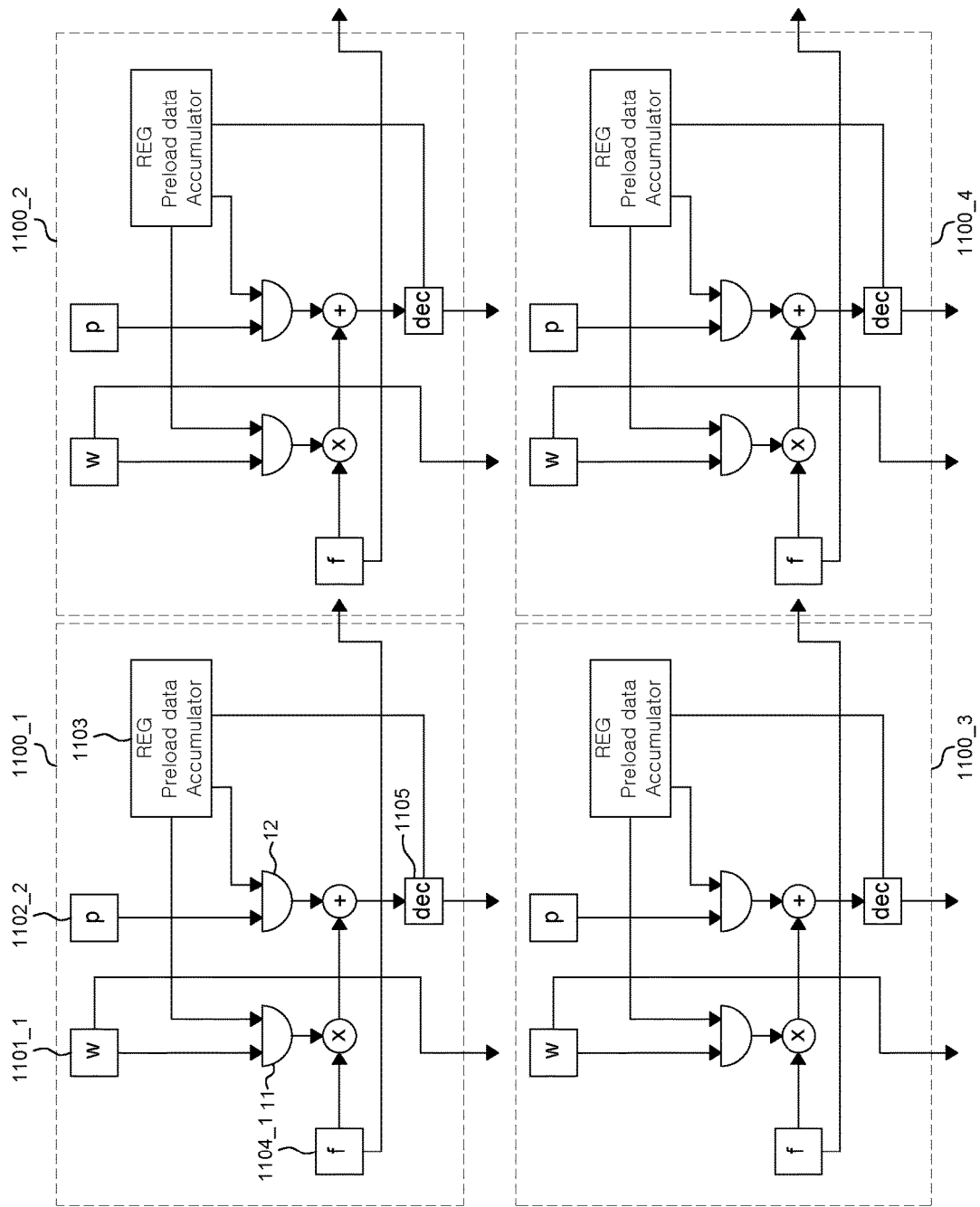
FIG. 11 is a configuration diagram illustrating a configurable MAC architecture according to an embodiment of the present disclosure.

FIG. 11 is a configuration diagram illustrating a configurable MAC architecture according to an embodiment of the present disclosure.

Referring to FIG. 11, a MAC architecture including four MAC operators 1100_1, 1100_2, 1100_3, and 1100_4 is shown. Each of the first MAC operator 1100_1, the second MAC operator 1100_2, the third MAC operator 1100_3, and the fourth MAC operator 1100_4 has a configurable MAC structure. The configurable MAC means a MAC having a structure in which the stationary mode can be switched by a control signal of a compiler or controller. The MAC architecture shown in FIG. 11 is only an example, and the number of MAC operators does not limit the technical scope of the present disclosure.

Referring to FIG. 11, the first MAC operator 1100_1 may include a first multiplexer 11, a second multiplexer 12, a register file 1103, and/or a decoder dec 1105.

The first multiplexer 11 may select and output any one of the weight w 1101_1 or data transferred from the register file 1103.

The second multiplexer 12 may select and output any one of data transferred from the partial sum (p) 1102_1 or the register file 1103.

Artificial processing unit according to embodiments of the present disclosure may multiply the output value of the first multiplexer 11 by the input feature map f 1104_1, and sum the calculated result value and the output of the second multiplexer 12.

The decoder 1105 may receive the value resulting from the addition and transfer it to the register file 1103 of the third MAC operator 1100_3 or the first MAC operator 1100_1.

Figure 12:
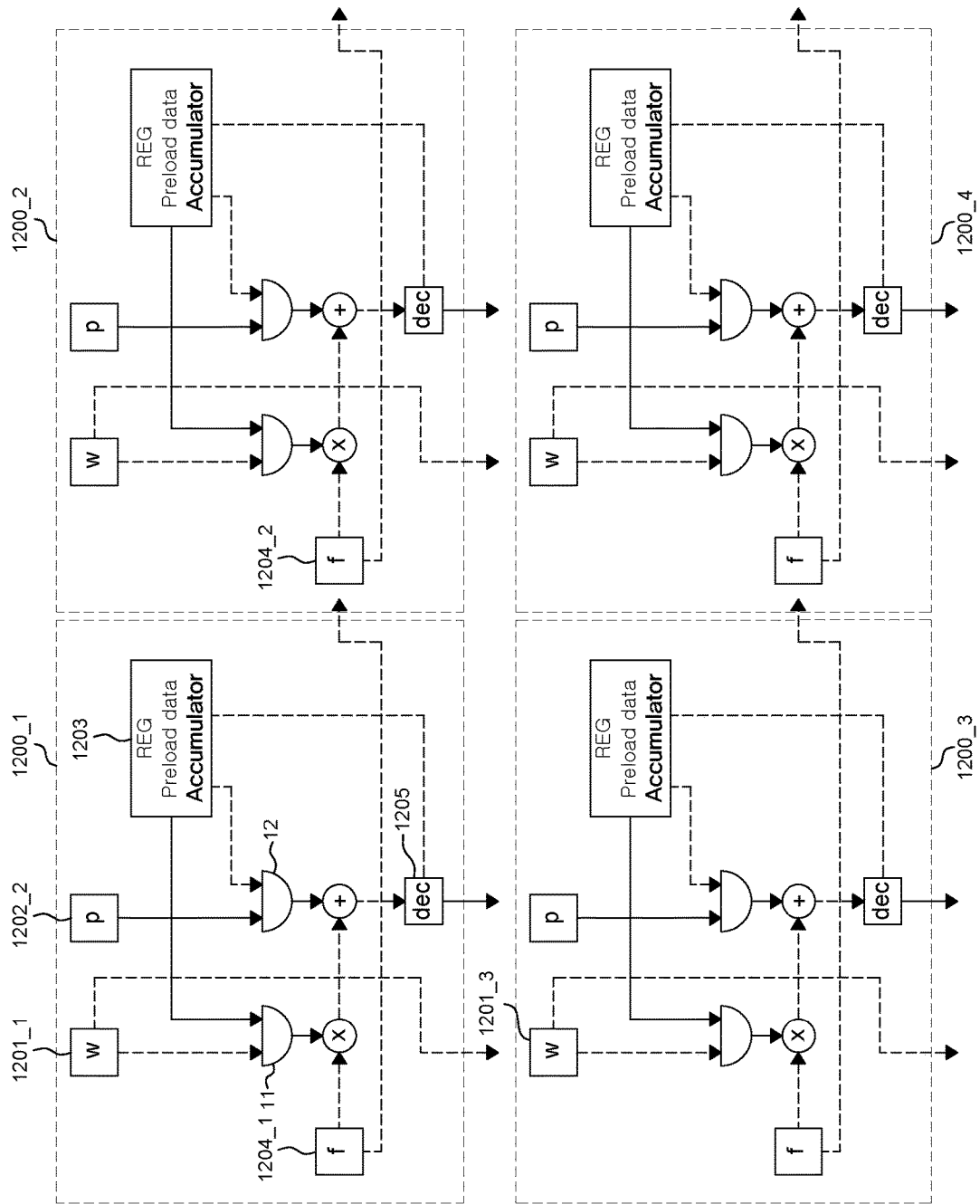
FIG. 12 is a configuration diagram illustrating a MAC architecture in an output stationary mode according to an embodiment of the present disclosure.

FIG. 12 is a configuration diagram illustrating a MAC architecture in an output stationary mode according to an embodiment of the present disclosure.

Referring to FIG. 12, a MAC architecture including four MAC operators 1200_1, 1200_2, 1200_3, and 1200_4 in output stationary mode is shown. In FIG. 12, the dotted line means a path through which actual data is delivered in the output stationary mode.

The first MAC operator 1200_1 may include a first multiplexer 13, a second multiplexer 14, a register file 1203, and a decoder dec 1205.

The first multiplexer 13 may select and output weights w 1201_1 among data transferred from the weights w 1201_1 or the register file 1103.

The weight w 1201_1 is transmitted to the first multiplexer 13 and simultaneously to the third MAC operator 1200_3 so that it can be reused. Depending on the embodiment, the weight w 1201_1 may be delivered to MAC operators located in the same column in a pipeline format.

The second multiplexer 14 may select and output data transferred from the register file 1103 among data transferred from the partial sum (p) 1102_1 or the register file 1103. In FIG. 12, the register file 1103 may be an accumulator in which a partial sum is stored. Accordingly, data transferred from the register file 1103 to the second multiplexer 14 may be a partial sum.

The artificial processing unit may calculate multiplication between the weight w, which is the output value of the first multiplexer 13, and the input feature map f 1204_1, and calculate the addition between the calculated result value and the partial sum, which is the output value of the second multiplexer 14.

The decoder 1105 may receive the value resulting from the addition and transfer it to the register file 1203 of the first MAC operator 1200_1.

The input feature map f 1204_1 may be transmitted to the second MAC operator 1200_2 to be reused while being transmitted to calculate multiplication with the weight w, which is an output value of the first multiplexer 13. Depending on the embodiment, the input feature map f 1204_1 may be delivered to MAC operators located in the same row in a pipeline format.

Figure 13:
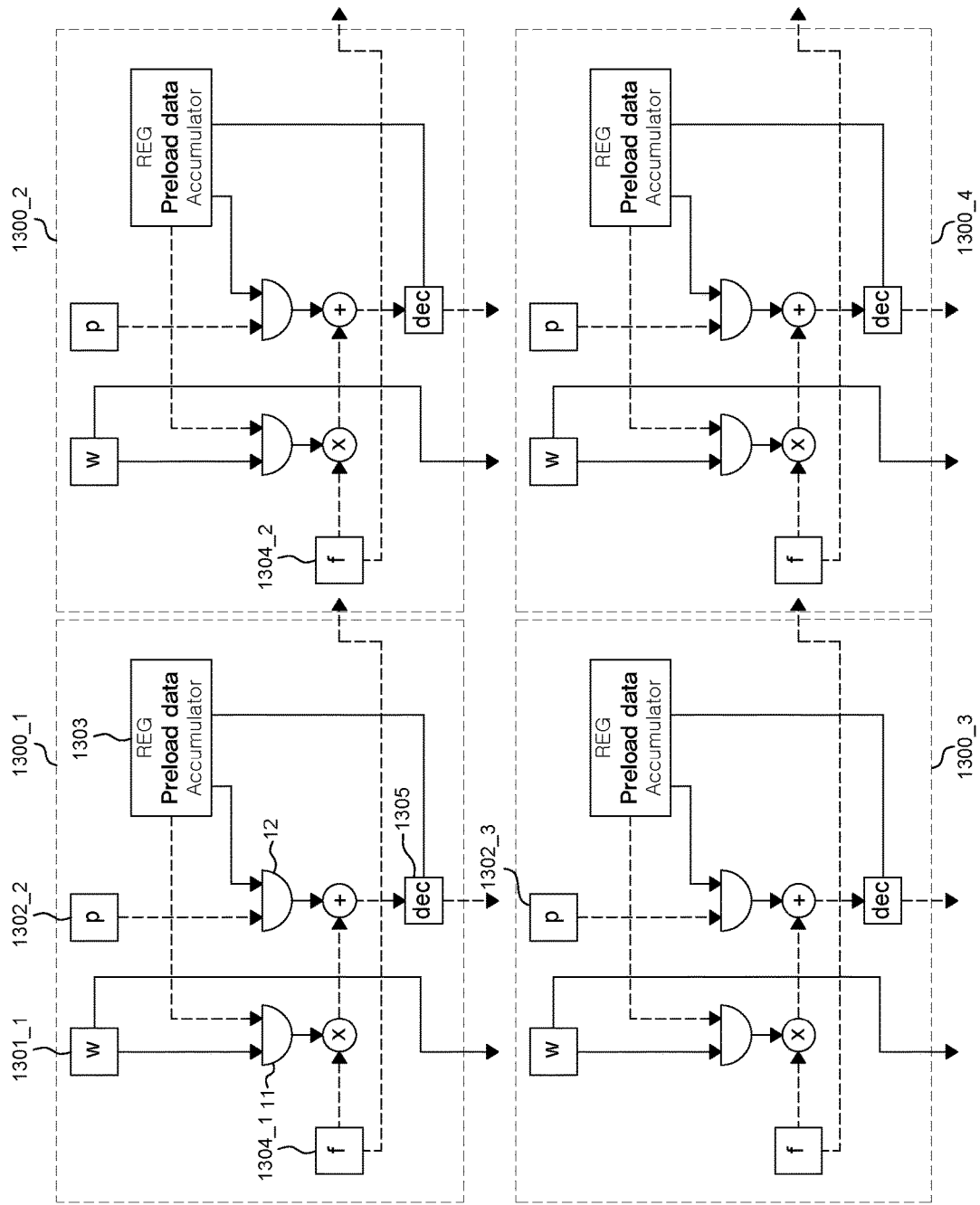
FIG. 13 is a configuration diagram illustrating a MAC architecture in a weight stationary or input stationary mode according to an embodiment of the present disclosure.

FIG. 13 is a configuration diagram illustrating a MAC architecture in a weight stationary or input stationary mode according to an embodiment of the present disclosure.

Referring to FIG. 13, a MAC architecture including four MAC operators 1300_1, 1300_2, 1300_3, and 1300_4 in weight stationary or input stationary mode is shown. In FIG. 13, the dotted line means a path through which actual data is transmitted in the weight stationary or input stationary mode.

The first MAC operator 1300_1 may include a first multiplexer 15, a second multiplexer 16, a register file 1303, and a decoder dec 1305.

The first multiplexer 15 may select and output data transmitted from the register file 1103 among data transmitted from the weight w 1301_1 or the register file 1103.

The second multiplexer 16 may select and output the partial sum p 1302_1 or the partial sum p 1302_1 of data transferred from the register file 1103. In FIG. 12, the register file 1303 may store a weight in the case of weight stationary mode and store an input feature map in the case of input stationary mode. Weights or input feature maps stored according to the stationary mode may be referred to as "preload data." Accordingly, data passed from the register file 1303 to the second multiplexer 16 may be a weight or an input feature map.

Artificial processing unit according to embodiments of the present disclosure may calculate multiplication between preload data, which is an output value of the first multiplexer 15, and the input feature map f 1204_1, and calculates addition between the calculated result value and the partial sum p 1302_1, which is an output value of the second multiplexer 14.

The decoder 1105 may receive the value resulting from the addition and transfer it to be reused as a partial sum p 1302_3 of the third MAC operator 1200_1.

The input feature map f 1304_1 may be transmitted to the second MAC operator 1200_2 to be reused while being transferred to perform a multiplication operation with pre-load data, which is an output value of the first multiplexer 15. Depending on the embodiment, the input feature map f 1204_1 may be delivered to MAC operators located in the same row in a pipeline configuration.

According to a method of operating a neural processing unit according to an embodiment of the present disclosure and according to the characteristics of each layer of the artificial neural network, the MAC operation time in the processing element array may be calculated, and the MAC operation structure may be switched for each layer based on the calculated MAC operation time. Accordingly, the MAC operation amount of the neural processing unit can be minimized by adopting the optimal MAC operation structure among the MAC operation structures of the three modes for each layer.

According to a method of operating a neural processing unit according to another embodiment of the present disclosure, according to the characteristics of the input feature map of the artificial neural network, the MAC operation time in the processing element array may be calculated, and the MAC operation structure may be switched for each tile or patch of the input feature map based on the calculated MAC operation time. Accordingly, the MAC calculation amount of the neural processing unit can be minimized by adopting an optimal MAC calculation structure among three modes of MAC calculation structures for each layer.

The examples of the present disclosure disclosed in the present specification and drawings are only presented as specific examples to easily explain the technical content of the present disclosure and help understanding of the present disclosure, and are not intended to limit the scope of the present disclosure. It is obvious to those skilled in the art that other modified examples based on the technical spirit of the present invention can be implemented in addition to the examples disclosed herein.

NATIONAL RESEARCH AND DEVELOPMENT PROJECT SUPPORTING THIS INVENTION

[Assignment identification number] 1711175834
[Assignment number] R-20210401-010439
[Name of department] Ministry of Science and ICT
[Task management (professional) institution name] National IT Industry Promotion Agency
[Research Project Name] Intensive Fostering of Innovative AI Semiconductor Companies
[Research Project Name] Development of compiler and runtime SW technology for edge artificial neural network processor
[Contribution rate] 1/1
[Name of project performing organization] DeepX Co., Ltd.
[Research period] 2022 Jun. 1~2022 Dec. 31

What is claimed is:

1. A method of operating a neural processing unit having a systolic array structure, the method comprising:
   determining, by a controller, that an operation performed in a first convolution layer is a transpose convolution operation;
   dividing, by the controller, a kernel used for the transpose convolution operation into a plurality of sub-kernels; and
   performing a convolution operation between an input feature map and each of the plurality of sub-kernels in the first convolution layer, the convolution operation performed by each of a plurality of processing elements,
   wherein each of the plurality of processing elements is configured to perform a process of reusing at least one of an output feature map, each of the plurality of sub-kernels, and the input feature map, which are values stored in a local memory of each of the plurality of processing elements, and
   wherein the reusing process is performed by a first processing element of the plurality of processing elements transferring the stored values of the at least one of the output feature map, each of the plurality of sub-kernels, and the output feature map to a second processing element of the plurality of processing elements,
   wherein the systolic array structure includes a plurality of structures arranged, in parallel, in correspondence to the values stored in the local memory, the stored values being used in successive convolution operations,
   wherein a multiply-and-accumulate (MAC) operation mode of the plurality of processing elements corresponds to one of the plurality of structures and is switched based on a calculated MAC operation time, and
   wherein the MAC operation mode includes an output stationary mode where the output feature map is reused, a weight stationary mode where each of the plurality of sub-kernels is reused, and an input stationary mode where the input feature map is reused.

2. The method of claim 1,
   wherein an input of the first convolution layer is the input feature map, and
   wherein the input feature map is a feature map obtained by padding input data with at least one zero.

3. The method of claim 2, further comprising:
   identifying a size of the input data and a size of the input feature map;
   determining a size of a stride for the plurality of sub-kernels; and
   determining a size of output data based on at least one of the size of the input feature map and the size of the stride.

4. The method of claim 1,
   wherein the kernel includes at least one weight value, and
   wherein at least one weight value is included in one of the plurality of sub-kernels.

5. The method of claim 3,
wherein the plurality of sub-kernels includes a first sub-kernel and a second sub-kernel,
wherein the first sub-kernel is determined according to a location of the input data included in a first window when the kernel corresponds to the first window of the input feature map, and
wherein the second sub-kernel is determined according to a location of the input data included in a second window when the kernel corresponds to the second window of the input feature map.

6. The method of claim 5, wherein the performing the convolution operation includes:
performing a convolution operation between the input feature map and the first sub-kernel in the first convolution layer; and
performing a convolution operation between the input feature map and the second sub-kernel in the first convolution layer after performing the convolution operation between the input feature map and the first sub-kernel.

7. The method of claim 6, wherein the convolution operation between the input feature map and the first sub-kernel is a convolution operation between the input data included in the input feature map and the first sub-kernel.

8. The method of claim 7,
wherein an output of the first convolution layer is the output feature map, and
wherein the output feature map has a larger size than the input data.

9. The method of claim 8, further comprising:
determining, by the controller, the plurality of sub-kernels based on at least one of the size of the input feature map, a size of the output feature map, at least one zero included in the input feature map, the location of the input data, the size of the stride, and a size of the kernel.

10. The method of claim 8, further comprising:
mapping, by the controller, the output data included in the output feature map to an address of an internal memory; and
storing, by the internal memory, the output data included in the output feature map at the mapped address.

11. A neural processing unit having a systolic array structure, the neural processing unit comprising:
an internal memory configured to store an artificial neural network model;
a plurality of processing elements each of which is configured to access the internal memory and to process a convolution operation of the artificial neural network model; and
a controller operably connected with the internal memory and the plurality of processing elements,
wherein the artificial neural network model is an artificial neural network-based model configured to perform image enhancement using an image as an input,
wherein the controller is configured to
determine that an operation performed in a first convolution layer is a transpose convolution operation,
divide a kernel used for the transpose convolution operation into a plurality of sub-kernels, and
control each of the plurality of processing elements to perform a convolution operation between an input feature map and each of the plurality of sub-kernels in the first convolution layer,
wherein each of the plurality of processing elements is further configured to perform a process of reusing at least one of an output feature map, each of the plurality of sub-kernels, and the input feature map, which are values stored in a local memory of each of the plurality of processing elements, and
wherein the reusing process is performed by a first processing element of the plurality of processing elements transferring the stored values of the at least one of the output feature map, each of the plurality of sub-kernels, and the output feature map to a second processing element of the plurality of processing elements,
wherein the systolic array structure includes a plurality of structures arranged, in parallel, in correspondence to the values stored in the local memory, the stored values being used in successive convolution operations,
wherein a multiply-and-accumulate (MAC) operation mode of the plurality of processing elements corresponds to one of the plurality of structures and is switched based on a calculated MAC operation time, and
wherein the MAC operation mode includes an output stationary mode where the output feature map is reused, a weight stationary mode where each of the plurality of sub-kernels is reused, and an input stationary mode where the input feature map is reused.

12. The neural processing unit of claim 11,
wherein an input of the first convolution layer is the input feature map, and
wherein the input feature map is a feature map obtained by padding input data with at least one zero.

13. The neural processing unit of claim 12, wherein the controller is further configured to
identify a size of the input data and a size of the input feature map;
determine a size of a stride for the plurality of sub-kernels; and
determine a size of output data based on at least one of the size of the input feature map and the size of the stride.

14. The neural processing unit of claim 13,
wherein the plurality of sub-kernels include a first sub-kernel and a second sub-kernel,
wherein the first sub-kernel is determined according to a location of the input data included in a first window when the kernel corresponds to the first window of the input feature map, and
wherein the second sub-kernel is determined according to a location of the input data included in a second window when the kernel corresponds to the second window of the input feature map.

15. The neural processing unit of claim 14, wherein the controller is further configured to
perform a convolution operation between the input feature map and the first sub-kernel in the first convolution layer, and
perform a convolution operation between the input feature map and the second sub-kernel after performing the convolution operation between the input feature map and the first sub-kernel in the first convolution layer.

16. The neural processing unit of claim 15, wherein the convolution operation between the input feature map and the first sub-kernel is a convolution operation between the input data included in the input feature map and the first sub-kernel.

17. The neural processing unit of claim 16,
wherein an output of the first convolution layer is the output feature map, and
wherein the output feature map has a larger size than the input data.

18. The neural processing unit of claim 17, wherein the controller is further configured to
  determine the plurality of sub-kernels based on at least one of the size of the input feature map, a size of the output feature map, at least one zero included in the input feature map, the location of the input data, the size of the stride, and a size of the kernel.

19. The neural processing unit of claim 17, wherein the controller is further configured to
  map the output data included in the output feature map to an address of an internal memory, and
  control the internal memory to store the output data included in the output feature map at the mapped address.

20. A neural processing unit having a systolic array structure, the neural processing unit comprising:
  a controller operatively connected to an internal memory and a plurality of processing elements,
  wherein the internal memory is configured to store one or more instructions executed by the controller,
  wherein the controller is configured to execute the one or more instructions to
    determine that an operation performed in a first convolution layer is a transpose convolution operation,
    divide a kernel used for the transpose convolution operation into a plurality of sub-kernels, and
    control a processing element to perform a convolution operation between an input feature map and each of the plurality of sub-kernels in the first convolution layer,
  wherein each of the plurality of processing elements is configured to perform a process of reusing at least one of an output feature map, each of the plurality of sub-kernels, and the input feature map, which are values stored in a local memory of each of the plurality of processing elements, and
  wherein the reusing process is performed by a first processing element of the plurality of processing elements transferring the stored values of the at least one of the output feature map, each of the plurality of sub-kernels, and the output feature map to a second processing element of the plurality of processing elements,
  wherein the systolic array structure includes a plurality of structures arranged, in parallel, in correspondence to the values stored in the local memory, the stored values being used in successive convolution operations,
  wherein a multiply-and-accumulate (MAC) operation mode of the plurality of processing elements corresponds to one of the plurality of structures and is switched based on a calculated MAC operation time, and
  wherein the MAC operation mode includes an output stationary mode where the output feature map is reused, a weight stationary mode where each of the plurality of sub-kernels is reused, and an input stationary mode where the input feature map is reused.

* * * * *